(12) United States Patent
Natsume et al.

(10) Patent No.: US 6,213,514 B1
(45) Date of Patent: *Apr. 10, 2001

(54) FUEL TANK SYSTEM OF A MOTOR BICYCLE

(75) Inventors: Tetsuji Natsume, Hamamatsu; Katsuhiko Tokunaga, Hamakita, both of (JP)

(73) Assignee: Suzuki Kaisha Toshiba, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,454

(22) Filed: Dec. 15, 1997

(30) Foreign Application Priority Data

| Dec. 20, 1996 | (JP) | 8-342189 |
| Dec. 20, 1996 | (JP) | 8-342190 |
| Dec. 20, 1996 | (JP) | 8-342191 |
| Dec. 26, 1996 | (JP) | 8-347673 |
| Dec. 26, 1996 | (JP) | 8-347674 |

(51) Int. Cl.[7] .................................................. B60P 3/22
(52) U.S. Cl. ................................... 280/833; 280/834
(58) Field of Search ............................... 280/833, 834, 280/835; 180/219; 220/562, 500, 86.2

(56) References Cited

U.S. PATENT DOCUMENTS

| 3,832,901 | * | 9/1974 | Girvin, III | 280/835 |
| 3,926,274 | * | 12/1975 | Morioka et al. | 280/835 |
| 3,944,009 | * | 3/1976 | Katagiri | 180/219 |
| 3,987,294 | * | 10/1976 | Carlson | 280/833 |
| 4,396,084 | * | 8/1983 | Yoshimura et al. | 180/219 |
| 4,401,309 | * | 8/1983 | Matsuzaki et al. | 280/835 |
| 4,449,723 | * | 5/1984 | Shiratsuchi | 280/833 |
| 4,461,489 | * | 7/1984 | Tsukiji et al. | 280/833 |
| 4,469,190 | * | 9/1984 | Yamaguchi | 180/219 |
| 4,577,719 | * | 3/1986 | Nomura et al. | 180/219 |
| 4,629,201 | * | 12/1986 | Hiramatsu | 180/225 |
| 4,648,474 | * | 3/1987 | Shinozaki et al. | 180/219 |
| 4,653,762 | * | 3/1987 | Nakamura et al. | 280/833 |

(List continued on next page.)

*Primary Examiner*—Kevin Hurley
*Assistant Examiner*—Andrew J. Fischer
(74) *Attorney, Agent, or Firm*—Finnegan, Henderson, Farabow, Garrett, & Dunner, L.L.P.

(57) ABSTRACT

A fuel tank system of a motor bicycle according to the present invention comprises: a tank main body made of a synthetic resin, which is formed into a reverse U-letter shape in its longitudinal section in a manner of riding on a front head portion of a vehicle-body frame; a fuel supply port which is provided on an upper portion of the tank main body; a receiving pan portion which is provided in the fuel supply port; a relay joint which is arranged in a vicinity of a bottom portion of the tank main body and whose attaching direction is the substantially same as an attaching direction of the receiving pan portion; and a drain pipe which comprises a soft hose, passes through an interior of the tank main body, and connects between the receiving pan portion and the relay joint.

Further, a fixing member for fixing the tank main body to the vehicle-body frame is formed out of a rigid material independently from the tank main body, a fixing portion on the tank main body side of the fixing member has a shape formed so as to surround a fixture plate of the relay joint, and the fixing member has a shape in its side view such that at least part of the fixing member is situated on a position lower than the relay joint when the fixing member is fixed to the tank main body.

25 Claims, 15 Drawing Sheets

U.S. PATENT DOCUMENTS

| | | | | |
|---|---|---|---|---|
| 4,694,924 | * | 9/1987 | Asakura et al. | 180/219 |
| 4,712,637 | * | 12/1987 | Mogi et al. | 180/219 |
| 4,717,163 | * | 1/1988 | Tsukiji | 280/833 |
| 4,796,901 | * | 1/1989 | Furukawa | 180/219 |
| 4,799,569 | * | 1/1989 | Hattori et al. | 180/219 |
| 4,871,041 | * | 10/1989 | Saito et al. | 180/219 |
| 4,911,474 | * | 3/1990 | Fukuda | 280/835 |
| 4,984,650 | * | 1/1991 | Horiike et al. | 280/835 |
| 5,054,571 | * | 10/1991 | Takasaka | 180/219 |
| 5,107,949 | * | 4/1992 | Gotoh et al. | 180/219 |
| 5,127,561 | * | 7/1992 | Miyamoto | 224/32 R |
| 5,145,023 | * | 9/1992 | Tsurumi et al. | 180/68.1 |
| 5,211,255 | * | 5/1993 | Fukuda | 180/219 |
| 5,458,257 | * | 10/1995 | Muckelrath et al. | 220/562 |
| 5,479,324 | * | 12/1995 | Barry | 362/72 |
| 5,490,549 | * | 2/1996 | Biette | 150/167 |
| 5,542,706 | * | 8/1996 | Kubly | 280/833 |
| 5,884,380 | * | 3/1999 | Thurm | 29/401.1 |

* cited by examiner

FUEL TANK SYSTEM OF A MOTOR BICYCLE

BACKGROUND OF THE INVENTION

1. Field of the Invention

The present invention relates to a fuel tank system of a motor bicycle wherein its tank main body is integrally molded out of a synthetic resin so as to freely form a shape of the tank, increase a capacity of the tank, and to facilitate a process of manufacturing the tank itself.

2. Description of the Related Art

For example, in the case where a fuel supply port of the aforesaid tank main body made of a synthetic resin is provided with a flat surface recessed type tank cap that is referred to as an aircraft type tank cap, there has been employed a structure in which the fuel supply port of the tank main body is provided with a metallic receiving pan portion, and a tank cap is fixed onto the receiving pan portion by means of a bolt.

While driving in rainy weather or during refueling, water or fuel may gather on the surface of the receiving pan portion. For this reason, there is a need for a drain pipe to discharge water or fuel from the surface of the receiving pan portion. Conventionally, a metallic pipe has been used as the drain pipe. The metallic pipe typically passes through so as to provide a connection between the receiving pan portion and a relay joint, which is provided in the tank main body itself. The relay joint is attached in an inconspicuous place such as the inside of a portion where the tank main body rides on a vehicle-body frame, and is also connected so that a hose extends to the outside therefrom.

However, tank main bodies that are made of a synthetic resin have a number of disadvantages. Specifically, when the tank main body swells due to contact with a fuel, it then becomes slightly deformed (e.g., mainly enlarged) in its whole dimensional shape. For this reason, there is a possibility that a spacial dimension between the receiving pan portion of the fuel supply port and the relay joint varies. In such a case, a metallic drain pipe having no expandability is not adaptable to a dimensional deformation between the receiving pan portion and the relay joint. Because the metallic drain pipe is not adaptable, an unreasonable force is applied to a connective section of the drain pipe. As a result, there is a possibility of causing deterioration in seal performance. Further, because the metallic drain pipe is not capable of being formed into a complicated or curved shape a drain discharge direction cannot be easily selected.

Moreover, if the tank main body is made of metal, then during assembling (e.g., a welding process) the drain pipe is simultaneously assembled into the interior of the tank main body. If the tank main body is made of a synthetic resin, however, the following process is required. After the tank main body is molded, a worker inserts a hand through the fuel supply port and into the interior of the tank main body to assemble the relay joint and the drain pipe therein. Then, the receiving pan portion is attached to the fuel supply port. As a result, assembling workability or performance of the tank main body is worsened depending upon where the relay joint is positioned.

As also described above, the tank main body swells due to contact with a fuel. For this reason, a fixed portion of the tank main body must be attached so as to be relatively movable with respect to the vehicle-body frame. This is so because the fixed portion must be floatingly fixed to the vehicle-body frame in order to achieve a vibration-proof tank main body.

To give a general example of a conventional fuel tank system, a front portion of the tank main body made of a synthetic resin has been provided with two right and left front portion fixing members while a rear portion thereof is provided with one rear portion fixing member. The front portion fixing member is formed like a plate that is parallel to a central surface of the vehicle body (i.e., in a longitudinal direction), and the front portion fixing member is fastened to the vehicle-body frame by means of a fixed bolt that penetrates along a vehicle width direction. On the other hand, the rear portion fixing member is formed like a substantially horizontal plate, and the rear portion fixing member is fastened to the vehicle-body frame by means of a fixed bolt that penetrates along a vertical (i.e., up and down) direction.

For example, a fixed bolt insertion hole of the rear portion fixing member is formed like a slot. Even if a dimension of the tank main body varies due to swelling, the rear portion fixing member is relatively slidable with respect to the fixed bolt so that a dimensional deformation of the tank main body can be absorbed. Further, rubber cushions or the like are interposed between three respective front and rear fixing members and the fixed bolt. As a result, vibration of the vehicle body may be prevented from being transmitted directly to the tank main body.

As described above, the front portion fixing member supporting the front portion of the tank main body has been formed like a plate that is parallel to the central surface of the vehicle body. For this reason, if the tank main body expands to a large scale size, then a high load acts along a direction of shearing the cushion rubber. Moreover, during rough road driving conditions or the like, a great push-up reactive force from a front fork may be applied to the tank main body via the front portion fixing member. Therefore, the rubber cushions may be crushed. As a result, it has been difficult to obtain a sufficient vibration-proof effect with respect to reactive forces in the vertical direction.

In addition, if the tank main body expands to a large scale size, then a dimensional deformation becomes large when the tank main body swells as a result of being spread in various directions. For this reason, even if only one of fixing members is fixed so as to be relatively movable with respect to the vehicle frame, it is impossible to absorb a dimensional deformation of the whole tank main body. For this reason, there is a high possibility that an unreasonable deformation stress is applied to the tank main body.

Further, there is a motor bicycle in which the tank main body made of a synthetic resin is covered with a frame cover made of a synthetic resin in order to protect the tank main body and to freely make a design having an attractive appearance. In this type of motor bicycle, if a structure is employed such that the frame cover is fixed directly to the tank main body, an unreasonable force may be applied to the frame cover due to a dimensional deformation, which may be caused by swelling of the tank main body. For this reason, the frame cover may become warped or damaged.

In view of the above circumstances, the following conventional fixing structure has been employed. Specifically, the frame cover is fixed to other members (e.g., vehicle-body frame or the like) positioned at the vicinity of the tank main body without being fixed directly to the tank main body. Or, only one portion of the frame cover is fixed to the tank main body, and other portions of the frame cover are fixed to the tank main body through the use of a surface fastener or the like so that a positioning correction can be easily made.

In the case where a relatively small tank main body is covered by a one-piece type frame cover, there is no problem even if the aforesaid fixing structure is employed. However, if the tank main body is enlarged to a large scale size, it is difficult to perform integral molding of the frame cover, and the frame cover must be constructed by being divided into a plurality of cover members and then joining these cover members together. For this reason, with the aforesaid fixing structure, a shift, unevenness or the like may occur between each of the plurality of cover members or between the cover members and the tank main body itself. As a result, the visible appearance around the fuel tank system may be remarkably deteriorated.

In a general fuel tank system of a motor bicycle, the tank main body has a shape of a reverse U-letter shaped longitudinal section (e.g., substantially the shape of a horseshoe), and is located so as to ride on the front head portion of the vehicle-body frame. Two or three fixing brackets provided on the front and rear portions of the tank main body are fixed and supported to the vehicle-body frame.

In particular, if the tank main body has a large capacity, a pair of right and left cushion members provided on the side of the vehicle-body frame are abutted against inner right and left longitudinal wall surfaces of a reverse U-letter shaped sectional portion of the tank main body. Accordingly, a great motion of the tank main body relative to a vehicle width direction is limited. In this manner, when a great force is applied to the side to the tank main body, such as due to a fall-down or collision of the motor bicycle, a stress to the fixing bracket is prevented from being concentrated and, thereby, damaged.

The attachment structure described above is effective in a tank main body that is made of metal. However, if the tank main body is integrally molded out of a synthetic resin material, then the tank main body can be swelled (e.g., expanded) by contact with a fuel. For this reason, elastic cushion members provided on the vehicle-body side may abut against the inner longitudinal wall surfaces. When the tank main body swells and deforms, the inner longitudinal wall surfaces are necessarily pressed against elastic cushion members. As a result, there is the possibility that a deformation is generated in the tank main body. Moreover, stress forces may also be concentrated on respective fixing brackets.

Further, regardless of the quality of the material of which the tank main body is made, in order to interpose the elastic cushion member between the vehicle-body frame and the inner longitudinal wall surface of the tank main body, a space between the vehicle-body frame and the tank main body must be made wide. For this reason, the capacity of the tank main body may need to be reduced.

By the way, in order to provide another independent component such as a tank cap or the like on the tank main body, the following method is employed. Specifically, when the tank main body is integrally molded out of a synthetic resin, a metallic insert nut is embedded, and the another independent component is fastened to the insert nut by means of a bolt. In the case of attaching the tank cap, a ring-like gasket (e.g., made of rubber) is interposed between the tank main body and the tank cap so that fuel leakage may be prevented.

However, the insert nut, which is embedded when the tank main body is integrally molded out of a synthetic resin, has a tendency such that the distal end surface is projected about 0.5 to 1.0 mm from the surface of the tank main body by hardening and shrinkage of the synthetic resin material after the tank main body is molded out of a synthetic resin. For this reason, for instance, in the case where the gasket is interposed between the tank main body and the tank cap so as to attach the tank cap as described above, the gasket bits into the projected distal end surface of the insert nut. As a result, seal performance remarkably deteriorates, and there is a possibility that the integrity of the gasket itself may be compromised.

Morever, without being limited to a single tank cap embodiment, in the case where other components made of a synthetic resin are fastened to the insert nut, there is the possibility that other types of soft components may be damaged by contact with the insert nut. Furthermore, various insert nuts may project or protrude unevenly. For this reason, it is difficult to stably fasten other components to all of insert nuts.

SUMMARY OF THE INVENTION

In order to solve the aforesaid problems, a fuel tank system of a motor bicycle has been invented according to the present invention. A first object of the present invention is to provide a fuel tank system having a tank main body made of a synthetic resin which is provided with an embedded (e.g, recessed) type tank cap, wherein a seal performance in a drain pipe connective portion of the tank cap is prevented from being deteriorated by a dimensional deformation due to swelling of the tank main body, a drain discharge direction or the like is freely selected, and an assembling workability or performance of the tank main body relative to a drain pipe arrangement is improved.

Further, a second object of the present invention is to prevent a seal performance between the tank main body a relay joint of the drain pipe from being deteriorated by swelling of the tank main body, and to protect the relay joint from being damaged by an external force.

Further, a third object of the present invention is to exhibit a sufficient vibration-proof effect while supporting a heavy weight of the tank main body even if the tank main body is made of a synthetic resin material and is expanded to a large scale size.

Further, a fourth object of the present invention is to reasonably absorb a dimensional deformation when the tank main body changes size, such as by swelling.

Further, a fifth object of the present invention is to prevent a recess surface for a knee grip provided on right and left sides of the tank main body made of a synthetic resin from being deformed by swelling of the tank main body without having to make a complicated mold for molding the tank main body.

Further, a sixth object of the present invention is to, in the case where the tank main body of a synthetic resin is covered by the frame cover, prevent a unreasonable force from being applied to a frame cover when the tank main body swells, and to preferably maintain a visible appearance.

Further, a seventh object of the present invention is to, in the case where the frame cover is attached to the tank main body made of a synthetic resin by means of an independent cover bracket, simplify a structure of a fixed portion on the tank main body side of the cover bracket, and to protect the tank main body by preventing a stress from being concentrated to the tank main body when a great external force is applied from the side to the cover bracket.

Further, an eighth object of the present invention is to prevent various fixing brackets from being damaged by a stress concentration when a great external force is applied to the side to the tank main so as (1) to prevent an unreasonable force from being applied to the tank main body when the tank main body swells and deforms even if the tank main body is made of a synthetic resin, and (2) secure a large capacity of the tank main body while improving an assembling performance to the vehicle-body frame.

Further, a ninth object of the present invention is to, in the case where other components are fastened to an insert nut embedded in the tank main body made of a synthetic resin, prevent other components from being damaged by the insert nut, and to stably fasten other components thereto.

To achieve the above first object, the present invention provides a fuel tank system of a motor bicycle comprising: a tank main body made of a synthetic resin, which is formed into a reverse U-letter shape in its longitudinal section in a manner of riding on a front head portion of a vehicle-body frame; a fuel supply port which is provided on an upper portion of the tank main body; a receiving pan portion which is provided in the fuel supply port; a relay joint which is arranged in a vicinity of a bottom portion of the tank main body and whose attaching direction is the substantially same as an attaching direction of the receiving pan portion; and a drain pipe which comprises a soft hose, passes through an interior of the tank main body, and connects between the receiving pan portion and the relay joint.

With the above construction, even if the tank main body swells and a dimensional deformation is generated between the receiving pan portion and the relay joint, since the drain pipe comprising a soft hose is adaptable to the dimensional deformation of the tank main body, the seal performance of the connective portion of the drain pipe is not deteriorated when an unreasonable force is applied thereto. Moreover, a curved shape of the drain pipe is freely set, so that the drain discharge direction or the like can be freely or easily selected.

Further, since the attachment direction of the relay joint, which is arranged in the vicinity of the bottom portion of the tank main body, is substantially the same as that of the receiving pan portion, positioning or the like is readily performed when assembling the relay joint or connecting the drain pipe in a state where a worker inserts a hand through the fuel supply port and into the interior of the tank main so as to improve the assembling workability or performance of the tank main body.

Further, to achieve the above second object, the present invention provides the fuel tank system of a motor bicycle, wherein a fixing member for fixing the tank main body to the vehicle-body frame is formed out of a rigid material independently from the tank main body, a fixing portion on the tank main body side of the fixing member has a shape formed so as to surround a fixture plate of the relay joint, and the fixing member has a shape in its side view such that at least part of the fixing member is situated on a position lower than the relay joint when the fixing member is fixed to the tank main body.

With the above construction, even if the tank main body swells and the fixture plate of the relay joint is dimensionally deformed, the fixing member is formed so as to surround the fixture plate, so that the fixture plate can be prevented from being dimensionally deformed by rigidity of the fixing member. Therefore, seal performance between the tank main body and the relay joint can be prevented from being damaged.

Moreover, since the relay joint is surrounded by the fixing member when the fixing member is fixed to the tank main body, in the case where the tank main body is removed from the vehicle-body frame of the motor bicycle, and then, is put on the floor or the like, at least part of the tank fixing member contacts with the floor prior to the relay joint. Therefore, the relay joint does not contact directly with the floor or the like, so that the relay joint can be protected from being broken down by an external force from side or below.

Further, to achieve the above third object, the present invention provides the fuel tank system of a motor bicycle, wherein a front portion fixing member is provided above and forward a reverse U-letter shaped sectional portion of the tank main body, a side view angle of a load acting surface thereof is set within an angular range from the horizontal to an angle orthogonal to a longitudinal direction of a front fork, the load acting surface is floatingly fixed to the vehicle-body frame.

With the above construction, a shearing load is not applied to a floating member (e.g., cushion rubber, etc.) of the front portion fixing member by either the weight of the tank main body or a push-up reactive force from the front fork, so that a sufficient vibration-proof effect can be exhibited with respect to the vertical (e.g., up and down) direction of the front portion of the tank main body.

Further, to achieve the above fourth object, the present invention provides the fuel tank system of a motor bicycle, wherein side portion fixing members are provided in front of the tank main body and on both sides of a lower portion of the reverse U-letter shaped sectional portion, an angle of respective load acting surfaces thereof is set so as to become substantially parallel with a vehicle body central surface, the respective load acting surfaces are fixed so as to be floatingly and relatively movable with respect to the vehicle-body frame, and a relative movement direction of the respective load acting surfaces is parallel [with] to a dimensional enlargement direction when the tank main body swells.

And also, to achieve the above fourth object, the present invention provides the fuel tank system of a motor bicycle, wherein a rear portion fixing member of the tank main body is provided on the rearmost portion of the tank main body, a load acting surface thereof is fixed so as to be floatingly and relatively movable with respect to the vehicle-body frame, and a relative movement direction of the load acting surface is parallel to a dimensional enlargement direction when the tank main body swells.

With the above construction, a load by rolling in a lateral (e.g., right and left) direction of the tank main body is released to the vehicle-body frame via the side portion fixing members, which are floatingly fixed to the vehicle-body frame, and the rearmost portion of the tank main body is also floatingly fixed to the vehicle-body frame via the rear portion fixing members, so that the whole of tank main body can be supported with respect to the vehicle-body frame so as to make the fuel tank system vibration-proof.

Since the side portion fixing members and the rear portion fixing member are relatively movable in the swelling or dimensional enlargement direction of the tank main body with respect to the vehicle-body frame, even if the tank main body swells and dimensionally deforms, the dimensional deformation can be absorbed by relative movement of respective fixing members and the vehicle-body frame.

According to such constructions mentioned above, even if the tank main body is of a large scale size, a vibration-proof effect can be sufficiently exhibited with respect to vertical (e.g., up and down) and lateral (e.g., right and left) directions while supporting a high load, and further, a dimensional deformation when the tank main body swells can be reasonably absorbed.

Further, to achieve the above fifth object, the present invention provides the fuel tank system of a motor bicycle, wherein respective right and left side surfaces of the tank main body are formed with a recessed surface for knee grip, a plurality of grip grooves are formed so that the recess surface has a section like a wave, a longitudinal direction of respective grip grooves is parallel to a divisional direction of a mold for molding the tank main body, the grip grooves are provided with a draft by enlarging a width dimension of an upper end of the grip groove than a width dimension of a lower end thereof, further, the upper end of the grip groove is formed like an open shape, and the lower end of the grip groove is formed like a closed shape.

With the above construction, the rigidity of the recessed surface for knee grip is improved so that the recessed surface can be prevented from being deformed by swelling of the tank main body. The longitudinal direction of the plurality of grooves is parallel with the divisional direction of the mold for molding the tank main body, and is provided with a draft. Further, the upper end of each groove is formed like an open shape. On the other hand, the lower end of each groove is formed like a closed shape. Therefore, no undercut is caused when the tank main body is molded, so that a complicated mold does not have to be employed.

Further, to achieve the above sixth object, the present invention provides the fuel tank system of a motor bicycle, wherein a fixing reference portion of a frame cover covering the tank main body is fitted into a fuel supply portion positioned at the top of the tank main body, tank fastening parts of the frame cover are floating fixed to the tank main body with use of both fastening members and cushion members, and fastening member insertion holes of the tank fastening parts are formed into a slot extending along a radial direction relative to the fixing reference portion.

With the above construction, the fixing reference portion of the frame cover is fitted into the fuel supply portion of the fuel tank, and thereby, the whole of frame cover can be accurately positioned with respect to the fuel tank. Further, the tank fastening member of the frame cover is floatingly fixed to the fuel tank, and thereby, a rotation or motion to the vertical (e.g., up and down) direction of the frame cover can be restricted with respect to the fuel tank.

When the fuel tank swells, the fuel tank entirely becomes large in its shape. For this reason, a shift is caused between the fuel tank and the frame cover. Since the fixing reference portion of the frame cover is fixed to the fuel supply portion on the top portion of the fuel tank, the tank fastening part, which is relatively separated from the fixing reference portion, is movable on the upper surface of the fuel tank along a direction that extends radially from the fuel supply portion. At this time, the fastening member that fixes the tank fastening part is relatively movable along a longitudinally axial direction of the fastening member insertion hole of the fastening part, so that each tank fastening part can be moved on the surface of the fuel tank without an unreasonable force being applied to the whole of frame cover.

As described above, even if the fuel tank swells, an unreasonable force is not applied to the frame cover, and the whole of frame cover is fixed directly to the fuel tank. This serves to obtain the following affect. Specifically, even if the frame cover is divided into a plurality of cover members and these cover member are joined together, a shift, unevenness or the like is hard to be caused between respective cover members or between these cover members and the fuel tank. Therefore, a visible appearance can be preferably maintained.

Further, to achieve the above seventh object, the present invention provides the fuel tank system of a motor bicycle, wherein a structure is provided such that one end of an independent cover bracket is fixed to a side of the tank main body and the frame cover is fixed to the other end of the cover bracket, the side of the tank main body is provided with a recess portion having a shape resembling to the cover bracket, one end of the cover bracket is fixed into the recess portion, and the cover bracket is provided with rigidity lowering means for lowering a side bending rigidity of the cover bracket at a position overlapping with a side profile of the tank main body.

With the above construction, since motion to a rotating direction of the cover bracket is restricted by the recessed portion formed in the fuel tank, only one fastening member is sufficient for fixing the cover bracket to the fuel tank. Accordingly, a structure of the fixing portion on the fuel tank side can be simplified.

Further, in the case where a great external force is applied from to a side of the motorcycle and to the cover bracket when the motor bicycle falls down, the cover bracket is bent into the fuel tank side from the portion of rigidity lowering means thereof. Since the rigidity lowering means is provided at a position such that the cover bracket overlaps with the fuel tank in its side profile, a stress to the fuel tank by the bending of cover bracket is prevented from being concentrated, so that the fuel tank can be protected.

Further, to achieve the above eighth object, the present invention provides the fuel tank system of a motor bicycle, wherein the whole of tank main body is floatingly fixed to the vehicle-body frame, inner longitudinal wall surfaces of the reverse U-letter shaped sectional portion of the tank main body are provided with recess portions, the recess portions are formed in its side view so as to be open in a direction separating from each other substantially at the right angle to the upper portion of the reverse U-letter section portion, elastic cushion members are individually interposed between one of the recess portions and the side surface of the vehicle-body frame and between the other of the recess portions and the same, and elastic cushion members are fixed to the vehicle-body frame side so that a clearance is defined between one of the elastic cushion members and one of the recess portions and between the other of the elastic cushion members and the other of recess portions thereof.

With the above construction, even if the fuel tank made of a synthetic resin swells and deforms, the inner longitudinal wall surface (e.g., the recess portion) of the fuel tank is not unreasonably pressed against the elastic cushion member. Further, if a great force is applied to the side of the fuel tank, since the inner longitudinal wall surface (e.g., recess portion) of the fuel tank is abutted against the elastic cushion member, a stress is prevented from being concentrated to the fixing bracket supporting the fuel tank. Consequently, a breakdown can be avoided.

Further, since the elastic cushion member is provided in the recess portion on the inner longitudinal wall surface of the fuel tank in a manner of being embedded in the fuel tank, there is no need for widening a space between the vehicle-body frame and the fuel tank. Therefore, the elastic cushion member can be provided without reducing a capacity of the fuel tank.

Furthermore, the recess portion is formed in its side view so as to be open in a direction separating from each other substantially at the right angle to the upper portion of the reverse U-letter shaped section portion, in the case where the fuel tank is attached from above to the vehicle-body frame, the elastic cushion member is hard to interfere with the fuel tank. Therefore, an assembling performance of the fuel tank to the vehicle-body frame can be improved.

Further, to achieve the above ninth object, the present invention provides the fuel tank system of a motor bicycle, wherein an insert nut embedded in the tank main body is constructed so that other components are fastened thereto, and the insert nut is embedded so that an external exposure surface thereof becomes lower than an insert nut embedded surface of the tank main body.

With the above construction, the insert nut does not bite into other components fastened to the tank main body made of a synthetic resin, and therefore, other components can be prevented from being damaged by the insert nut. Further, other components are fully closely fitted into the insert nut embedded surface of the tank main body, so that other components can be stably fastened to the tank main body.

DETAILED DESCRIPTION OF THE PREFERRED EMBODIMENTS

Figure 1:
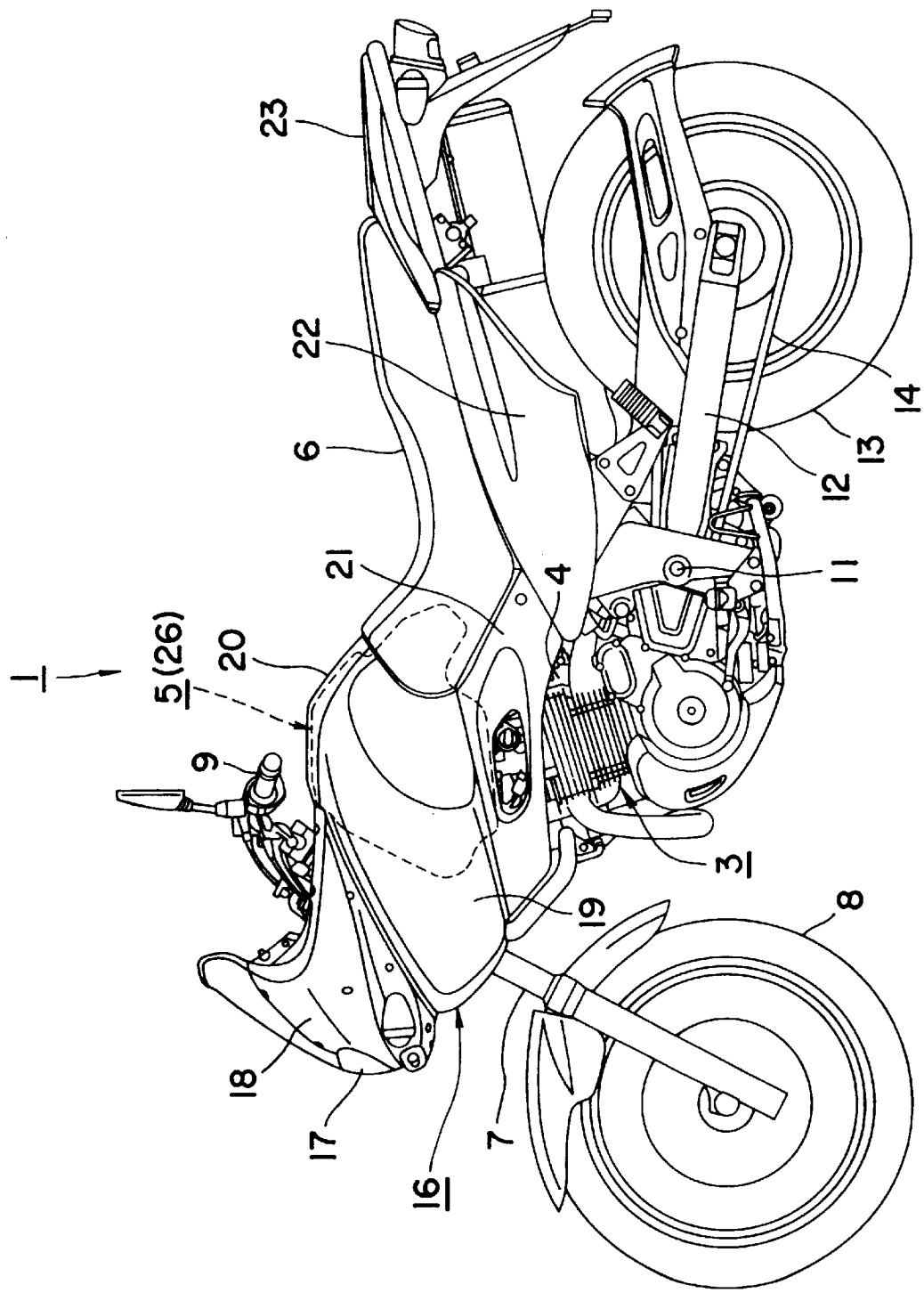
FIG. 1 is a left side view showing one example of a motor bicycle to which the present invention is applicable.

One embodiment of the present invention will be described below with reference to the accompanying drawings. FIG. 1 is a left side view showing one example of a motor bicycle to which the present invention is applicable, and FIG. 2 is an enlarged left side view showing the vicinity of a front portion of the motor bicycle shown in FIG. 1.

Figure 2:
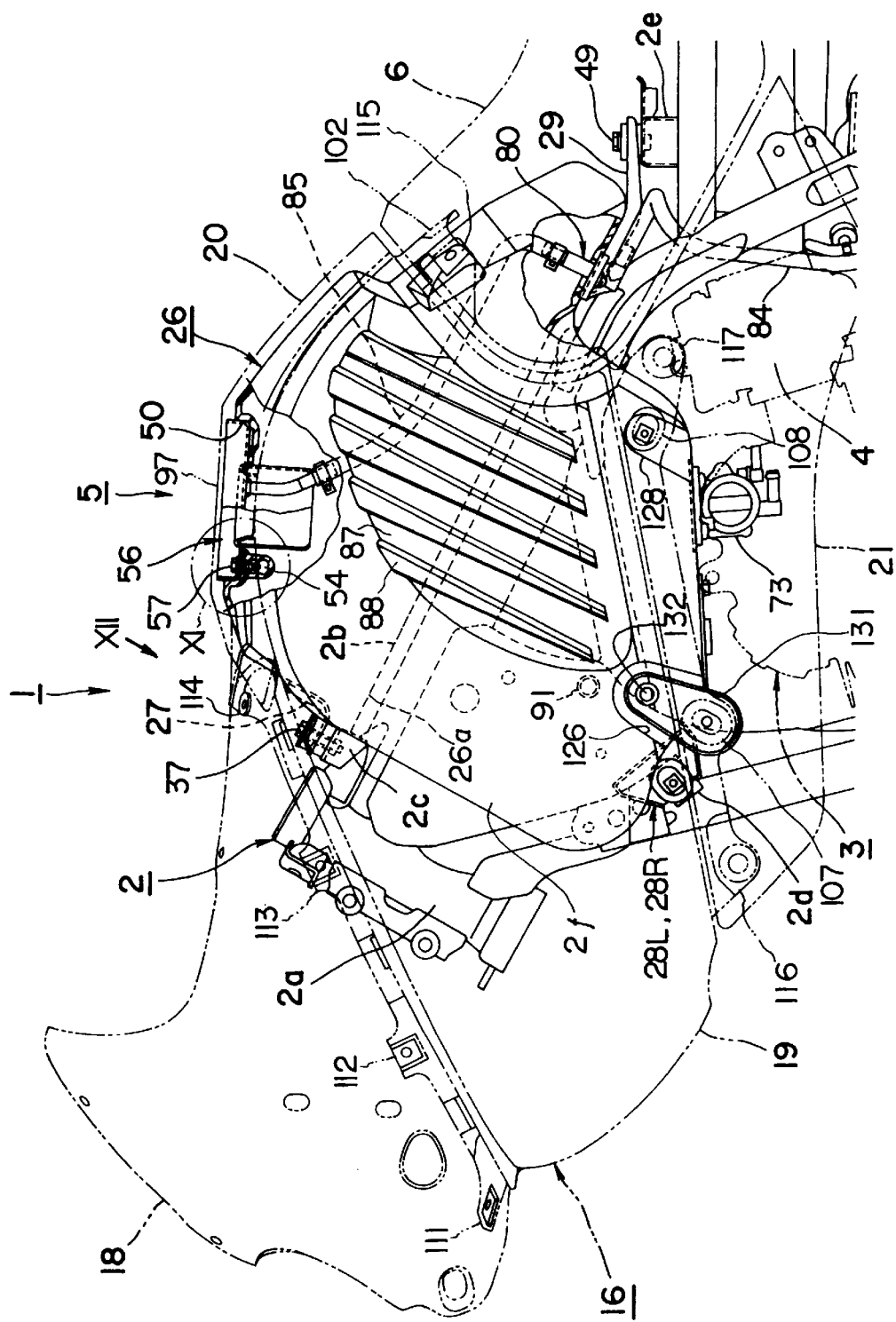
FIG. 2 is an enlarged left side view showing the vicinity of a front portion of the motor bicycle shown in FIG. 1.

A motor bicycle 1 is equipped with, for example, a semi-double cradle type vehicle-body frame 2 (see FIG. 2). The front portion of the vehicle-body frame 2 is mounted with power apparatuses such as an engine 3, a carburetor 4 or the like. An upper portion of the engine 3 is provided with a fuel tank system 5, and a seat 6 is provided following a rear portion of the fuel tank system 5.

On the other hand, a front fork 7 is pivotally supported to a head pipe 2a situated on a front head portion of the vehicle-body frame 2 so as to be rotatably right and left. A front wheel 8 is supported to a distal end of the front fork 7, and an upper portion of the front fork 7 is provided with a handlebar 9. Further, a swing arm 12 is supported to a pivot shaft 11 stretched to a central lower portion of the vehicle-body frame 2 so as to be swingably up and down, and a rear wheel 13 is supported to a rear portion of the swing arm 12. A power of the engine 3 is transmitted to the rear wheel 13 via a chain 14.

A frame cover 16 made of a synthetic resin, which covers respective portions of the vehicle body, is mounted. The frame cover 16 is constructed by joining together a plurality of divided cover members, that is, a front cowl 18, a tank side cover 19, a tank upper cover 20, an engine side cover 21, a seat side cover 22, and a tail cover 23.

The front cowl 18 is situated on a forward portion of the handlebar 9, and a head light 17 or the like is attached thereto. The tank side cover 19 extends backward while connecting with a lower portion of the front cowl 18 so as to cover a side face of the fuel tank system 5 (i.e., a tank main body 26 which will be described later). The tank upper cover 20 covers an upper portion of the fuel tank system 5. The engine side cover 21 connects with a lower portion of the tank side cover 19 so as to cover upper right and left side faces of the engine. The seat side cover 22 covers right and left lower portions of the seat 6. Further, the tail cover 23 is provided so as to connect with a rear portion of the seat 6.

Figure 3:
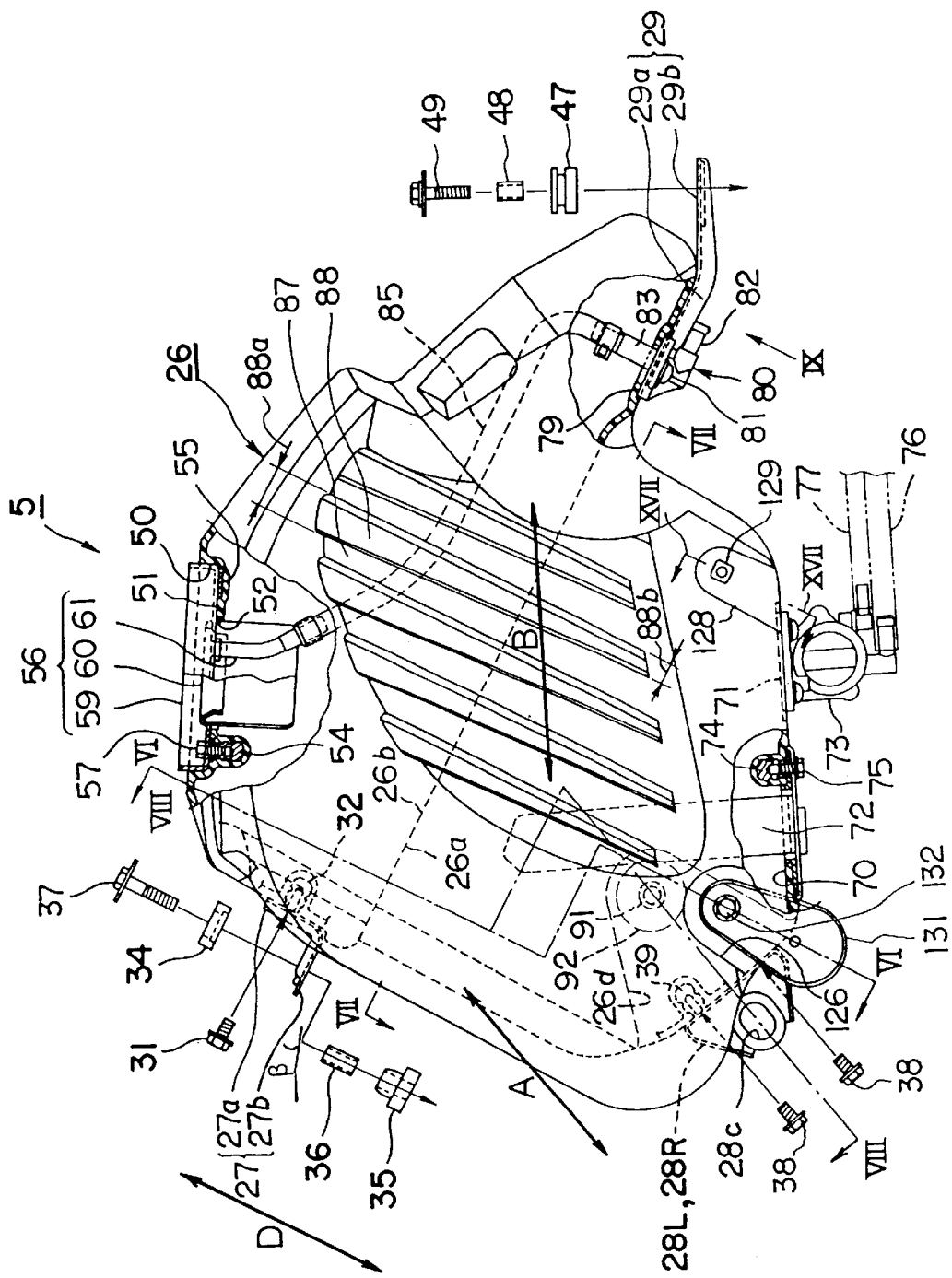
FIG. 3 is a left side view of a fuel tank system which is mounted onto the motor bicycle shown in FIG. 1 and 2.
Figure 4:
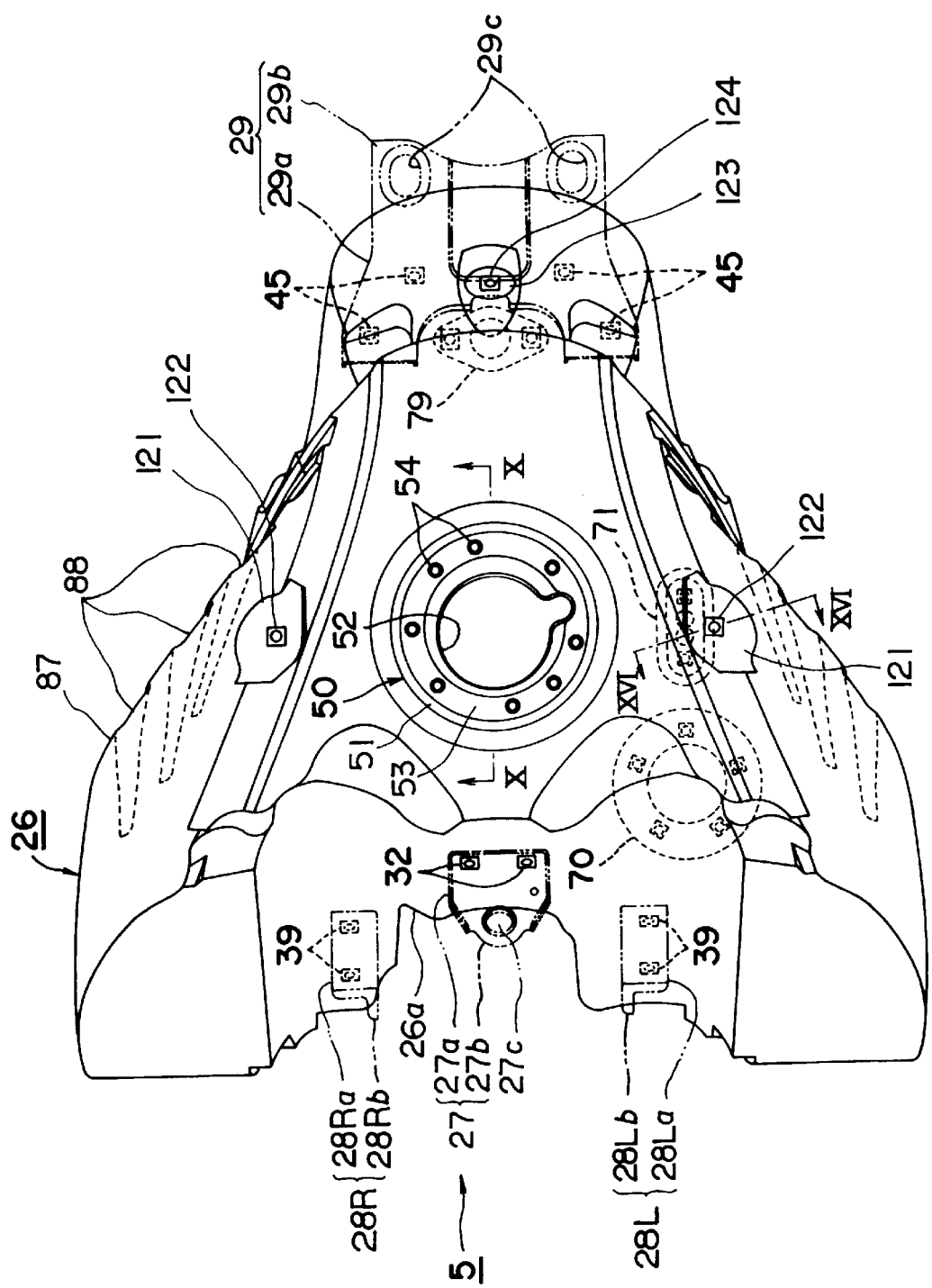
FIG. 4 is a plan view of the fuel tank system.
Figure 5:
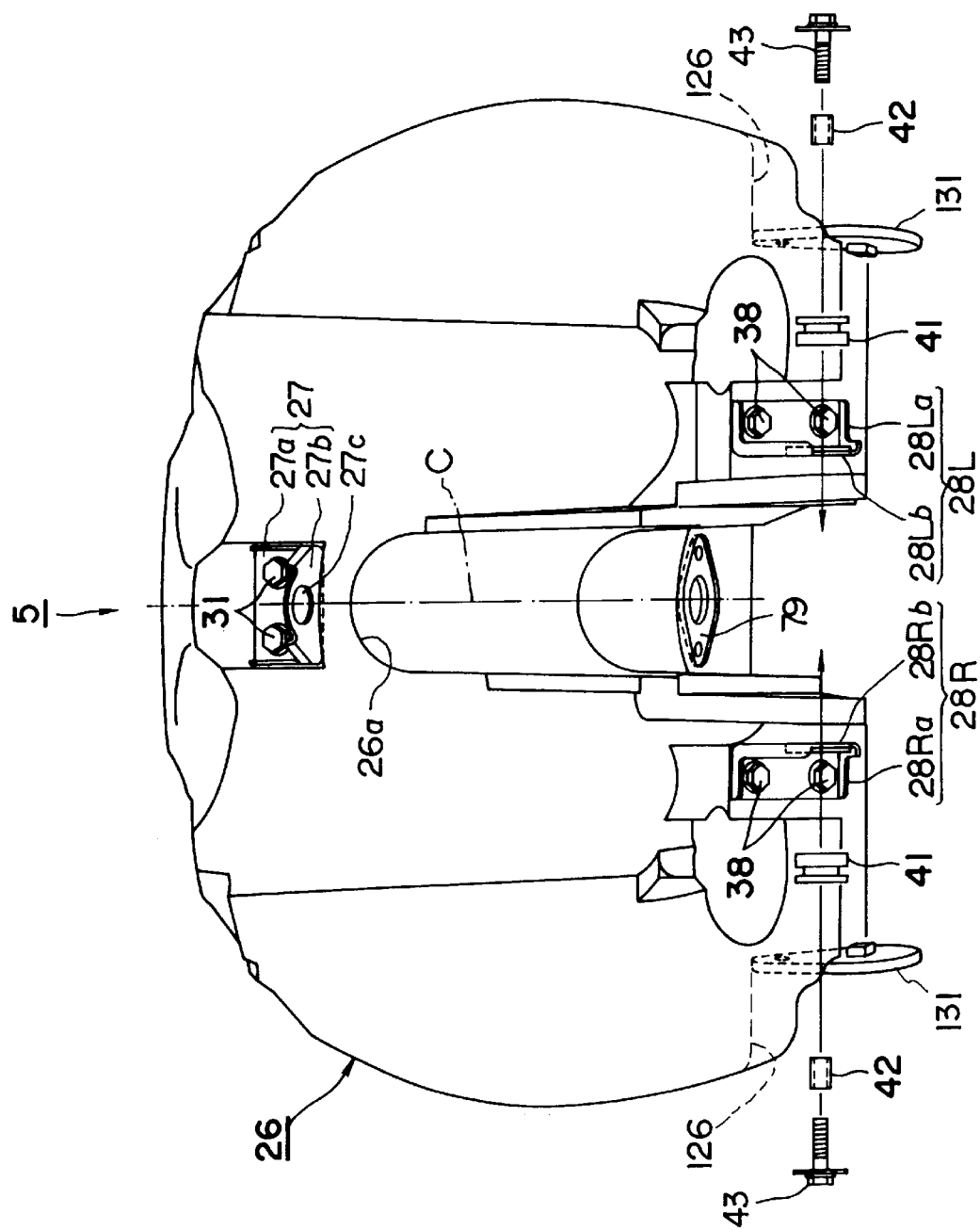
FIG. 5 is a front view of the fuel tank system.
Figure 6:
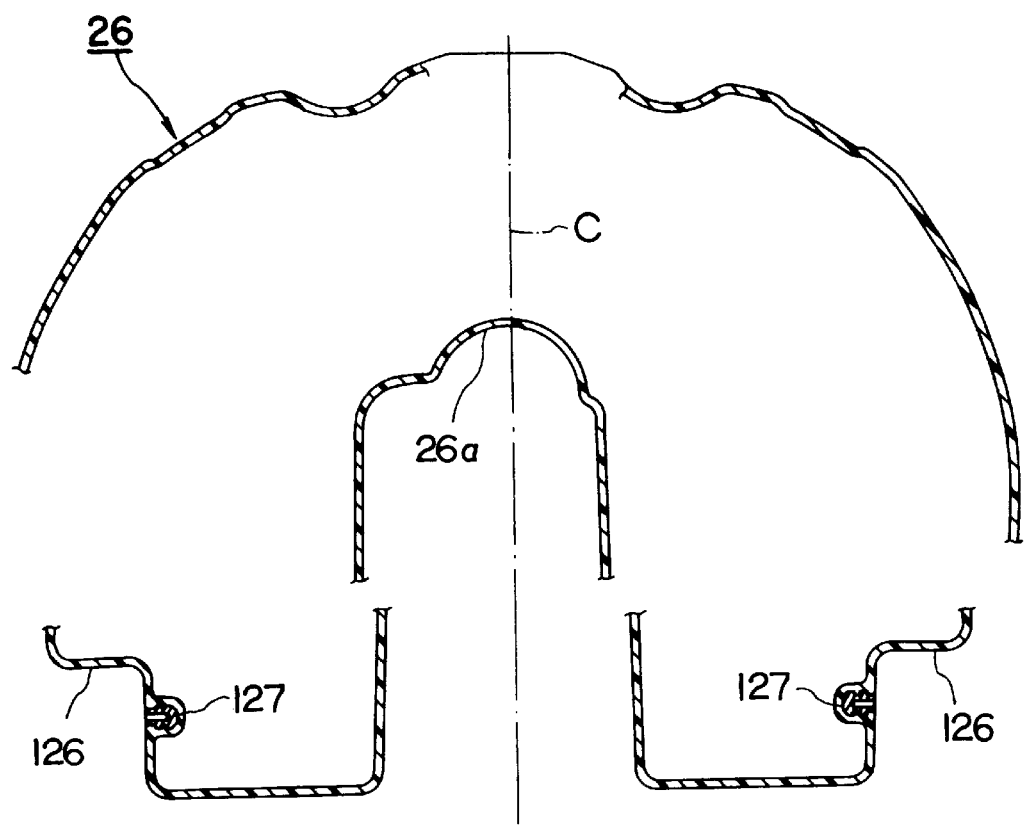
FIG. 6 is a cross-sectional view cut along the line VI—VI of FIG. 3.
Figure 7:
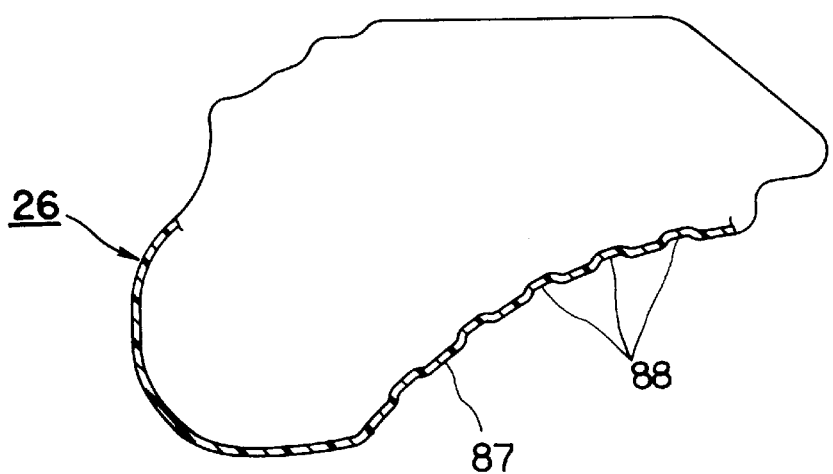
FIG. 7 is a cross-sectional view cut along the line VII—VII of FIG. 3.
Figure 8:
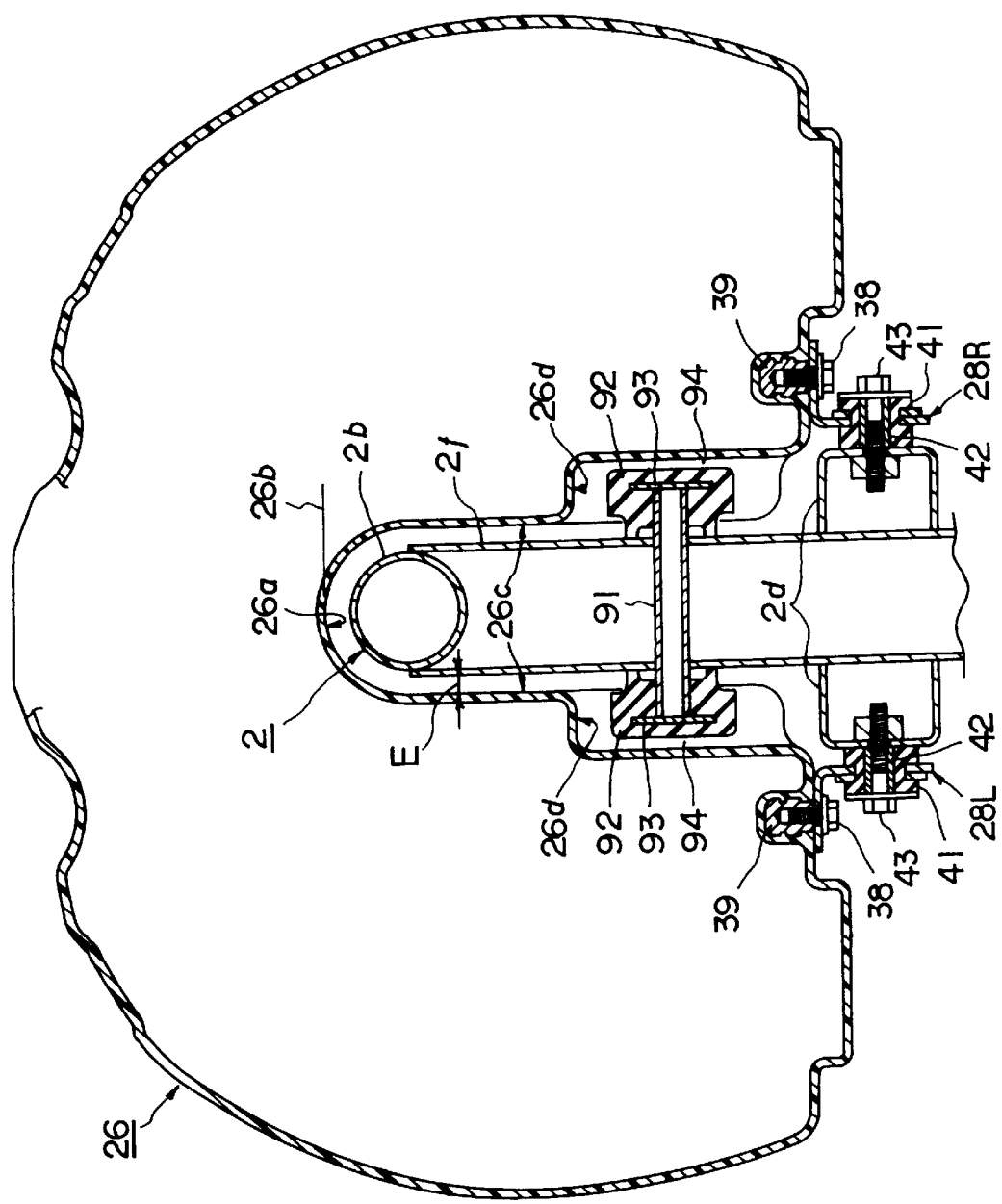
FIG. 8 is a cross-sectional view cut along the line VIII—VIII of FIG. 3.
Figure 9:
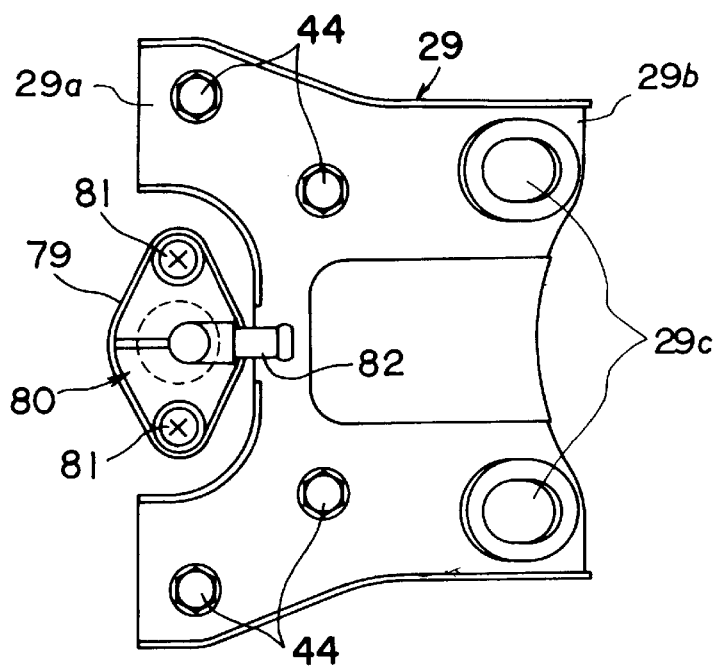
FIG. 9 is a view from a direction indicated by an arrow IX of FIG. 3.
Figure 10:
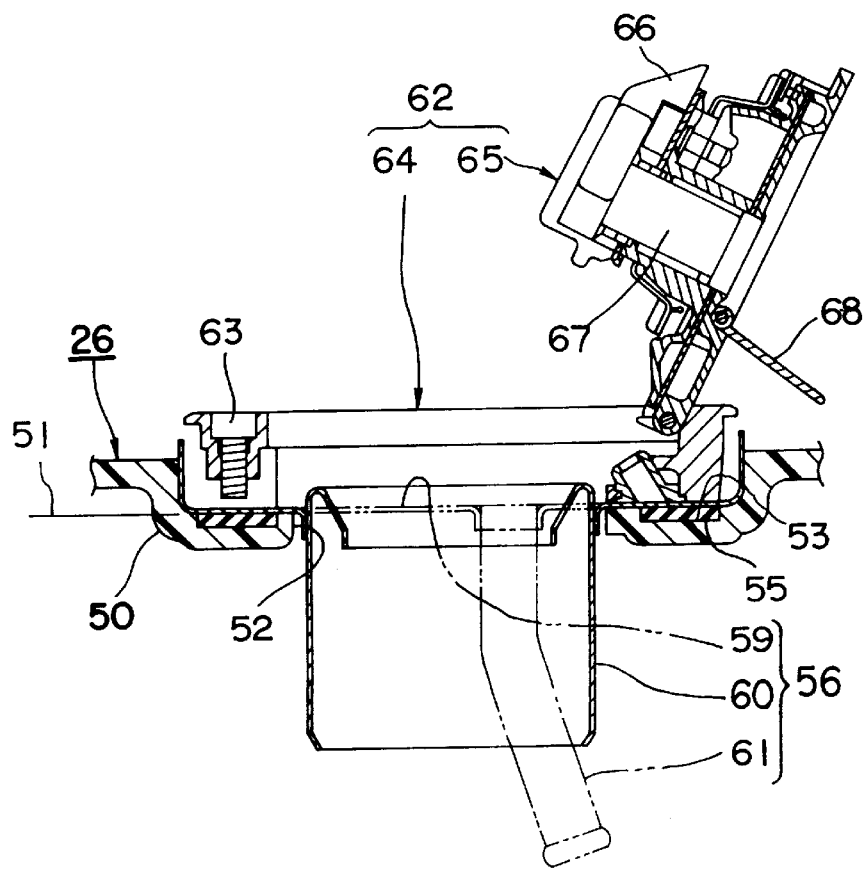
FIG. 10 is a longitudinally cross-sectional view cut along the line X—X of FIG. 4.

FIGS. 3 to 5 are a left side view, a plan view and a front view of the fuel tank system 5, respectively. Also, FIGS. 6 and 7 are cross-sectional views cut along the lines VI—VI and VII—VII of FIG. 3, FIG. 8 is a cross-sectional view cut along the line VIII—VIII of FIG. 3, FIG. 9 is a view from a direction indicated by an arrow IX of FIG. 3, and FIG. 10 is a longitudinally cross-sectional view cut along the line X—X of FIG. 4.

The fuel tank system 5 includes a tank main body 26 which is integrally molded out of a synthetic resin material such as PE or the like. The tank main body has a substantially reverse U-letter section shape for riding from above on a main pipe 2b positioned on the front head portion of the vehicle-body frame 2. Further, the tank main body 26 is fixed to the vehicle-body frame 2 via a front portion fixing member 27, side portion fixing members 28L and 28R and a rear portion fixing member 29, which are formed by subjecting rigid materials such as a plate and a sheet to press molding.

As shown in FIGS. 2 to 5, the front portion fixing member 27 is arranged above a reverse U-letter shaped sectional portion 26a on the front side of the tank main body 26. Further, the front portion fixing member 27 has a fastening surface 27a and a load acting surface 27b, and is formed into a substantially L-letter shape in its side. The fastening surface 27a is fastened onto an insert nut 32 embedded in the front side of the tank main body 26 by means of two bolts 31.

A side view angle β of the load acting surface 27b, when the front portion fixing member 27 is fixed to the tank main body 26 as described above, is set so as to extend along a direction orthogonal to a longitudinal direction of the front fork 7 in this embodiment. In this case, the angle β of the load acting surface 27b may be set within an angular range from this angle to the horizontal.

The load acting surface 27b is formed with a circular hole 27c, alternatively referred to as an aperture, and rubber cushion 34 and 35 and a spacer 36 of a metallic pipe are fitted into the circular hole 27c. A bolt 37, alternatively referred to as a fastening member, is inserted into the spacer 36 from above and fastened to a fixing bracket 2c (see FIG. 2) just after the head pipe 2a of the vehicle-body frame 2. Thus, the load acting surface 27b is floatingly (i.e., vibration proof) fixed with respect to the vehicle-body frame 2 by an elasticity of cushion rubbers 34 and 35.

On the other hand, side portion fixing members 28L and 28R are arranged on both sides at the lower portion of the reverse U-letter sectional portion 26a on the front side of the tank main body 26. These side portion fixing members 28L and 28R have a fastening surface 28La, 28Ra and a load acting surface 28Lb, 28Rb, and are formed into a substantially L-letter shape, respectively. Respective fastening surfaces 28La, 28Ra are fastened onto an insert nut 39 embedded in the lower portion on the front side of the tank main body 26 by means of two bolts 38. An angle of respective fastening surfaces 28La, 28Ra, when these side portion fixing members 28L and 28R are fixed to the tank main body 26, is set so as to be substantially parallel to a vehicle-body central surface C (see FIGS. 5 and 6).

Respective load acting surfaces 28Lb and 28Rb are formed with a slot 28c (see FIG. 3), and a cushion rubber 41 and a spacer 42 shown in FIG. 5 are respectively fitted into the slot 28c. A bolt 43, which is inserted through the spacer 42 from the outside, is fastened to a fixing bracket 2d (see FIG. 2), which is located at right and left sides on the front portion of the vehicle-body frame 2.

Thus, these load acting surfaces 28La and 28Ra are fixed to the vehicle-body frame 2 so as to be floatingly and relatively movable in a longitudinal axial direction of the slot 28c by an elasticity of the cushion rubber 41. The longitudinal axial direction of the slot 28c is parallel with a dimensional enlargement direction A (see FIG. 3) when the tank main body swells.

Further, the rear portion fixing member 29 is formed having a fastening surface 29a and a load acting surface 29b. The fastening surface 29a is fastened to insert nuts 45 (see FIG. 4) embedded in the lower face on the rear portion of the tank main body 26 by means of four bolts 44 (see FIG. 9). An angle of the load acting surface 29b when the rear portion fixing member 29 is fixed to the tank main body is set so as to become substantially horizontal.

The load acting surface is formed with a pair of right and left slots 29c, 29c at its rear portion as shown in FIG. 4. A cushion rubber 47 and a spacer 48 shown in FIG. 3 are fitted into each of slots 29c, 29c. A bolt 49, which is inserted through the spacer 48 from above, is fastened to a fixing bracket 2e (see FIG. 2) which is located above an intermediate portion of the vehicle-body frame 2.

Thus, the load acting surface 29b is fixed to the vehicle-body frame 2 so as to be floatingly and relatively movable in a longitudinally axial direction of the slot 28c by an elasticity of the cushion rubber 47. The longitudinally axial direction of the respective slots 29c, 29c is parallel to a dimensional enlargement direction B (see FIG. 3) when the tank main body swells.

As described above, the side view angle of the load acting surface 27b of the front portion fixing member 27 is set within an angular range from the horizontal to an angle orthogonal to the longitudinal direction of the front fork 7. For this reason, a weight of the tank main body 26 and a push-up reactive force from the front fork 7 do not apply a shearing load to the cushion rubbers 34 and 35 of the front portion fixing member 27. Therefore, cushion rubbers 34 and 35 carry only loads in the vertical direction, so that they can sufficiently exhibit a vibration proof effect in the vertical direction on the front portion of the tank main body 26.

Further, a load due to rolling in a lateral (e.g., right and left) direction of the tank main body 26 is released to the vehicle-body frame 2 via side portion fixing members 28L and 28R and the cushion rubber 41, and a load that is exerted on the rear portion of the tank main body 26 is also applied to the vehicle-body frame 2 via the rear portion fixing member 29 and the cushion rubber 47.

As described above, respective portions of the tank main body 26 are floatingly supported as a whole, and a load from one direction is only applied to these cushion rubbers 34, 35, 41 and 47. Therefore, no shearing load is applied. Thus, even if the tank main body 26 is a large-scale tank, vibration proof effect can be sufficiently exhibited in the vertical direction and the right and left direction while carrying a high load of the tank.

Further, the longitudinally axial direction of the slots 28c of the side portion fixing member 28L and 28R and the longitudinally axial direction of the slots 29c of the rear portion fixing member 29 and 28R, are parallel with the dimensional enlargement directions A and B when the tank main body 26 swells, respectively. Therefore, even if the tank main body 26 swells due to contact with a fuel and is dimensionally deformed (e.g., enlarged), the side portion fixing members 28L and 28R and the rear portion fixing member 29 are relatively movable with respect to the vehicle-body frame 2 along the above dimensional enlargement direction A and B, so that a dimensional deformation of the tank main body 26 can be reasonably absorbed.

As shown in FIG. 2 to FIG. 4, FIGS. 10 and 11, the upper portion of the tank main body 26 is provided with a fuel supply port 50. The fuel supply port 50 has a circular receiving pan fixing surface 51 which is lower one step than the upper surface of the tank main body 26, and is formed with an opening 52 at its central portion. The receiving pan fixing surface 51 is formed with an annular shallow gasket groove 53 which surrounds the opening 52. Several insert nuts 54 are embedded along the gasket groove 53. An annular and strip-like gasket 55 formed of a chemical proof rubber or the like is fitted into the gasket groove 53, and then, a metallic receiving pan portion 56 is placed thereon, and further is fastened to the insert nuts 54 by means of some bolts 57.

The receiving pan portion 56 has a pan member 59, which is pressed and molded into a dish shape, a cylindrical member 60 fixed to a hole formed at the center of the pan member 59, and a union member 61, which extends downward vertically from one side of the pan member 59 to the interior of the tank main body 26. The gasket 55 is closely attached to the lower surface of the pan member 59.

As shown in FIG. 10, a recessed type (i.e., the so-called aircraft type) tank cap 62 is fixed to the pan member 56 by means of several bolts 63. The tank cap 62 has a construction in which a cap assembly 65 is attached to a cap base 64 so as to be freely opened and closed. When the cap assembly 65 is closed, a lock lever 66 of the cap assembly 65 is latched on a lower portion of the cylindrical member 60 of the pan member 56, and then, the cap assembly 65 is locked.

The cap assembly 65 is equipped with a key cylinder 67. The latch of the lock lever is released by inserting a specified key into the key cylinder 67 and twisting it, and then, the cap assembly 65 is opened. A reference numeral 68 denotes a lid of the key cylinder 65.

Meanwhile, a bottom portion on the left side of the tank main body 26 is provided with two kinds of fixture plates 70 and 71 at its front and rear. As shown in FIG. 3, a remaining fuel gauge 72 is attached toward the inside of the fixture plate 70 on the front side. On the other hand, a fuel cock 73 is attached from the outside to the fixture plate 71 on the rear side. The remaining fuel gauge 72 is fastened to insert nuts 74 embedded in the fixture plate 70 by means of a bolt 75. Also, the fuel cock 73 is connected with a fuel hose 76 and a vacuum hose 77, and the other ends of these hoses 76 and 77 are connected to the carburetor 4.

Further, as shown in FIG. 9, the bottom portion on the left side of the tank main body 26 is provided with a fixture plate 79, and a relay joint 80 is fixed to the fixture plate from the outside by means of two vises 81. The attachment direction of the relay joint is the substantially identical direction as that of the receiving pan portion 56. Thus, this serves to facilitate an assembling work operation of the relay joint 80 when a worker inserts a hand into the interior of the tank main body 26 through the fuel supply port, and a positioning work operation when making a connection of a drain pipe 85, which will be described later. Therefore, assembling workability or performance of the tank main body 26 can be improved.

The relay joint 80 is an integrally molded product made of, for example, a synthetic resin material, and includes an outer union 82 extending outside the tank main body 26, and an inner union 83 extending inside the tank main body 26 as shown in FIG. 3. An external hose 84 (see FIG. 2) connected to the outer union 82 is extended downward, and its free end is open to the outside.

One end of the drain pipe 85 is connected to the inner union 83; the other end the drain pipe 85 is connected to the union member 61 of the receiving pan portion 56. In such a manner, the drain pipe 85 extends from the receiving pan portion 56 of the fuel supply port 50, and passes through the interior of the tank main body 26, and then, is connected to the relay joint 80. The drain pipe 85 is a hose made of a soft material such as rubber or the like, and is molded so that a immediately rear portion of the drain pipe 85 extending from the inner union 83 is bent at a right angle (e.g., 90 degrees) and is directed toward the receiving pan portion 56.

For example, while running the motorcycle in rainy weather or during supplying fuel, water or fuel flowing into the receiving pan portion 56 is discharged from the external hose 84 to the outside via the drain pipe 85 and the relay joint 80. If the tank main body 26 swells due to contact with a fuel, then a dimensional deformation between the receiving pan portion 56 and the relay joint may slightly vary. However, because drain pipe 85 is a soft hose, it is adaptable relative to the dimensional deformation. Therefore, even if an unreasonable force is applied to the connective portion of the drain pipe 85, no deterioration is caused in seal performance. Further, because it is possible to freely set a bent shape of the drain pipe 85 the drain discharge direction (e.g., a locating place of the relay joint 80) can be freely selected.

Meanwhile, as shown in FIGS. 4 and 9, the rear portion fixing member 29 for fixing the rear portion of the tank main body 26 to the vehicle body frame 2 is formed into a substantially U-letter shape such that a fixing portion on the tank main body 26 side surrounds the fixture plate 79 of the relay joint 80.

Even if the tank main body 26 swells and a dimensional deformation is caused in the fixture plate 79, the dimensional deformation can be prevented by rigidity of the rear portion fixing member 29. Therefore, a warp is hard to be caused in the fixture plate 79, and also, it is possible to prevent deterioration in seal performance between the tank main body 26 and the relay joint 80.

As shown in FIG. 3, when the fastening surface 29a of the rear portion fixing member 29 is fixed to the lower surface on the rear portion of the tank main body 26, the rear portion fixing member 29 has a side sectional shape such that at least part of the rear portion fixing member 29 is situated on a position lower than the relay joint 80. In the present embodiment, the rear portion fixing member 29 is slightly bent in its side view at a portion between the fastening surface 29a and the load acting surface 29b. Therefore, the load acting surface 29b is formed so as to become lower than the relay joint 80.

Thus, in the case of removing the tank main body 26 from the vehicle-body frame 2 and putting it on a floor or the like, the relay joint 80 does not directly contact with the floor or the like because the rear portion fixing member 29 contacts with the floor or the like prior to the relay joint 80. Therefore, the relay joint 80 can be effectively protected from a breakdown by an external force acting from the side or lower direction.

Meanwhile, as shown in FIG. 2 to FIG. 4 and 7, right and left sides of the tank main body 26 are formed with a recessed surface 87 which is slightly recessed inwardly. The recessed surface 87 serves to make stable a riding posture in a state in which a rider who rides on the motor bicycle 1 grips the tank main body 26 at his knee.

The recessed surface 87 is formed with a plurality of grip grooves 88 which extend in a substantially longitudinal direction. The recess surface 87 is formed like a wave in its section by these grip grooves 88. As shown in FIG. 3, a longitudinal direction of the respective grip grooves 88 is parallel with a divisional direction D of a mold for molding the tank main body 26. The divisional direction D is orthogonal to an upper side 26b of the reverse U-letter shaped sectional portion 26a, for example.

Further, a width dimension 88a of the upper end of the grip grooves 88 is larger than a width dimension 88b of the lower end thereof, and thereby, the grip groove 88 is provided with a draft. The upper end of the grip groove 88 is formed like an open shape. On the other hand, the lower end thereof is formed like a closed shape.

The aforesaid plurality of grip grooves 88 is provided on the recessed surface 87, and thereby, rigidity of the recessed surface 87 is remarkably improved. For this reason, the recessed surface 87 is hard to be deformed (i.e., hard to be swelled) when the tank main body 26 swells. These grip grooves 88 are parallel with the divisional direction D of the mold, and are provided with a draft, and further, their upper and lower ends are formed into an open-like shape and a closed-like shape, respectively. As a result, there is no generation of undercut when molding the tank main body 26. Therefore, complicated (e.g., multiple divided) molds do not need to be employed, so that the cost spent for these molds can be restricted more cheaply.

Figure 12:
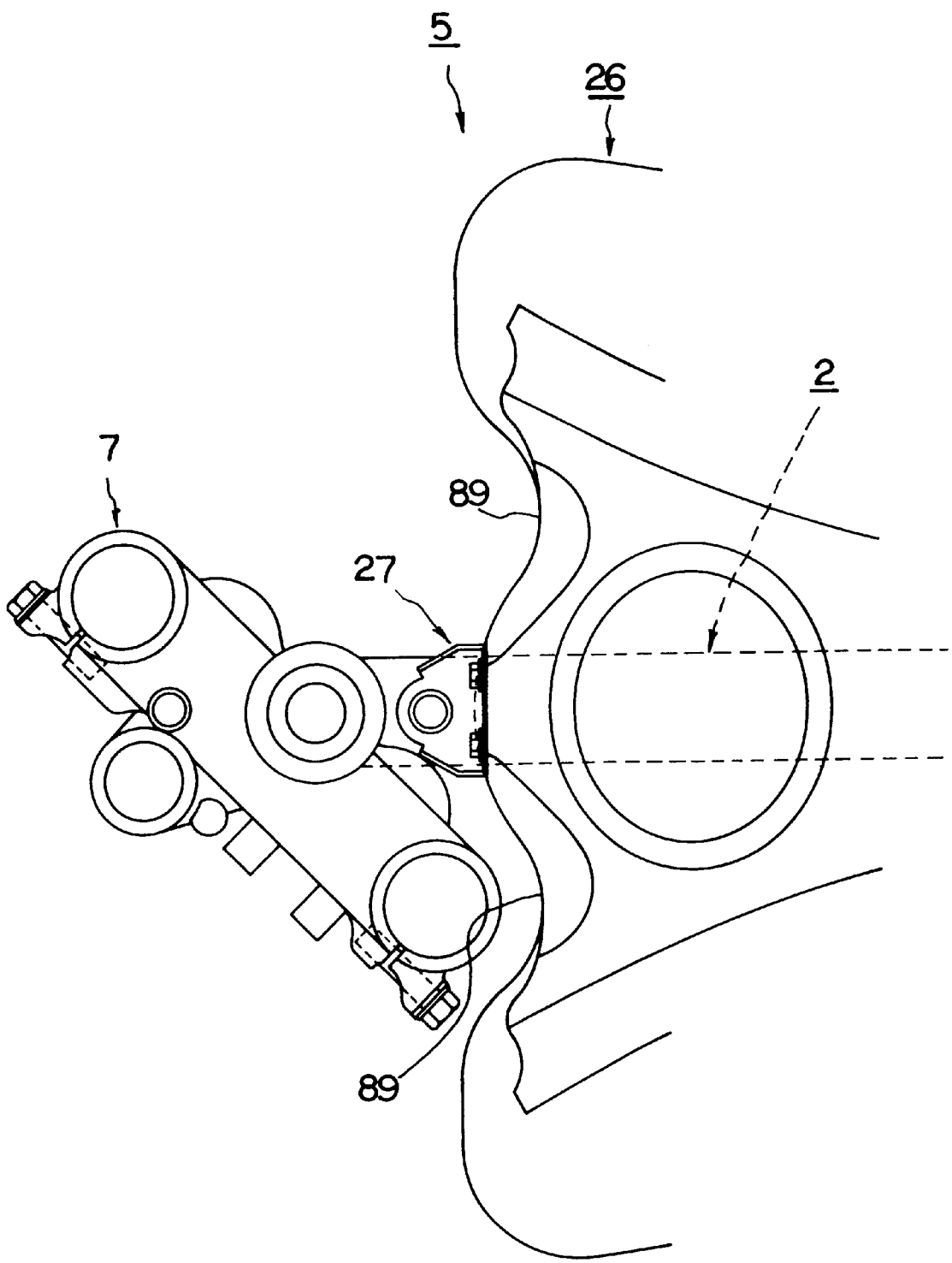
FIG. 12 is a view from a direction indicated by an arrow XII of FIG. 2.

As shown in FIG. 12, the front side of the tank main body 26 is formed with a pair of right and left thick relief grooves 89 which extend in a longitudinal direction. These relief grooves 89 serve to prevent the front fork 7 from contacting with the tank main body 26 when the handlebar 9 of the motor bicycle 1 is cut to the right and left. Also, the tank main body 26 has a front surface formed into a substantially flat surface except the aforesaid two relief grooves 89, and an inclination angle on the front side of tank main body 26 is set so as to meet a caster angle of the front fork 7.

Further, as shown in FIG. 4, the tank main body 26 is formed so that the forefront portion thereof has the maximum width, and the front portion of the tank main body 26 is constructed so as not to be overhung ahead the front fork 7.

The front portion of the tank main body 26 is formed into the shape as described above, and thereby, a capacity of the tank main body 26 is increased to the maximum limit while sufficiently securing the rigidity of the front portion of the tank main body 26. In this manner, it is possible to restrict a deformation by swelling of the tank main body 26, or to facilitate an absorption of the deformation by swelling.

On the other hand, as shown in FIGS. 3 and 8, inner longitudinal wall surface 26c and 26c on the reverse U-letter shaped sectional portion 26a of the tank main body 26 is provided with recess portions 26d and 26d. These recess portions 26d and 26d are formed so as to be open in a direction separating from or opposite to each other substantially at the right angle to the upper portion 26b of the reverse U-letter shaped section portion 26a in its side view so as to form perpendicular indents and define inner side clearance spaces (see FIG. 3), and to have an opened shape that is widened toward the end.

Meanwhile, one metallic pipe 91, alternatively referred to as a support member extending in a vehicle width direction is stretched across the front portion of the vehicle-body frame 2 at a position corresponding to recess portions 26d and 26d of the tank main body 26. The metallic pipe 91 is provided so as to be slidably in the vehicle width direction in a manner of penetrating through reinforcement plates 2f and 2f stacked to the front portion of the vehicle-body frame 2.

And then, elastic cushion members 92 and 92 formed of elastic materials such as rubber or the like are attached to right and left both ends of the metallic pipe 91. Thus, the elastic cushion members 92 and 92 are fixed on the vehicle-body frame 2 side, and interposed between recess portions of the tank main body 26 and the side (e.g., reinforcement plates 2f and 2f) of the vehicle-body frame 2 (i.e., inside the inner side clearance spaces).

Metallic plates 93 and 93 are embedded in the elastic cushion members 92 and 92. The elastic cushion members 92 and 92 are each inserted into the metallic pipe 91 until the metallic plates 93 and 93 abut against the right and left both ends of the metallic pipe 91. Also, as shown in FIG. 8, a clearance 94 is defined between the right elastic cushion member 92 and the recess portion 26d of the tank main body 26 and between the left elastic cushion member 92 and the recess portion 26d thereof. A width of the clearance is set to about several millimeters.

As described above, clearances 94 and 94 are defined between the right and left elastic cushion members 92 and the tank main body 26 (e.g., recess portions 26d and 26d). Thus, even if the tank main body 26 made of a synthetic resin swells and is deformed due to contact with a fuel, the inner longitudinal wall surfaces 26c and 26c (e.g., recess portion 26d and 26d) are not forcedly pressed against the elastic cushion members 92 and 92. Therefore, it is possible to effectively avoid a deformation of the tank main body 26 or breakdown of respective fixing members 27, 28L, 29R and 29 by stress concentration.

In the case where a great force acts on the tank main body 26 from the side, such as when the motor bicycle 1 slips and falls down or is involved in a collision, although the tank main body 26, which is floatingly fixed to the vehicle-body frame 2, is slightly moved toward the side, either the right or left inner longitudinal wall surfaces 26c and 26c (i.e., recess portions 26d and 26d) of the tank main body 26 is directly abutted against the elastic cushion members 92 and 92. For this reason, the tank main body is not moved toward the side any more. This serves to prevent the breakdown of the tank main body 26 and the breakdown of respective fixing members 27, 28L, 29R and 29 by stress concentration.

Moreover, elastic cushion members 92 and 92 are also provided so as to be received in the recess portions 26d and 26d of the tank main body 26. For this reason, unlike the prior art, there is no need to widen an interval (e.g., distance) between the vehicle-body frame 2 and the tank main body 26 in order to provide elastic cushion members 92 and 92, so that a basic interval E (see FIG. 8) between the vehicle-body frame 2 and the tank main body 26 can be set so as to be narrower. Therefore, this makes it possible to locate these elastic cushion members 92 and 92 without decreasing the capacity of the tank main body 26. Also, the formation of recess portions 26d and 26d serve to greatly improve the rigidity of the inner longitudinal wall surface 26c and 26c.

As described above, these recess portions 26d and 26d are formed so as to be open in a direction separating from each other substantially at the right angle to the upper portion 26b of the reverse U-letter shaped section portion 26a in its side view, and to have a opened shape, which is widened toward the end. For this reason, in the case where the tank main body 26 is attached to the vehicle-body frame 2 (e.g., at main pipe 2b) from above, the elastic cushion members 92 and 92 may be prevented from interfering with the tank main body 26, so that the tank main body 26 can be smoothly assembled onto the vehicle-body frame 2.

Figure 13:
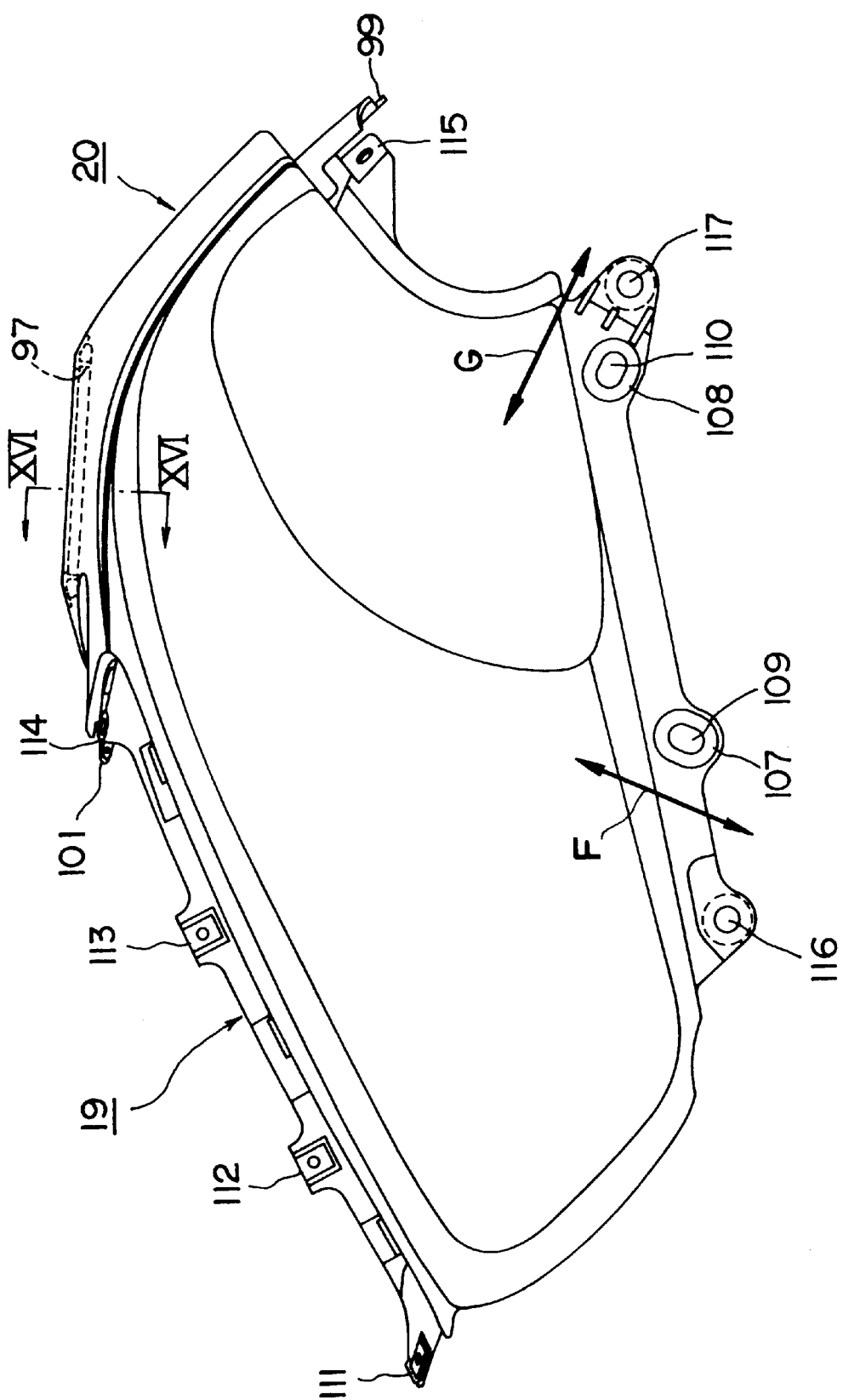
FIG. 13 is a left side view showing a state in which a tank side cover and a tank upper cover covering a tank main body of the fuel tank system are combined.
Figure 14:
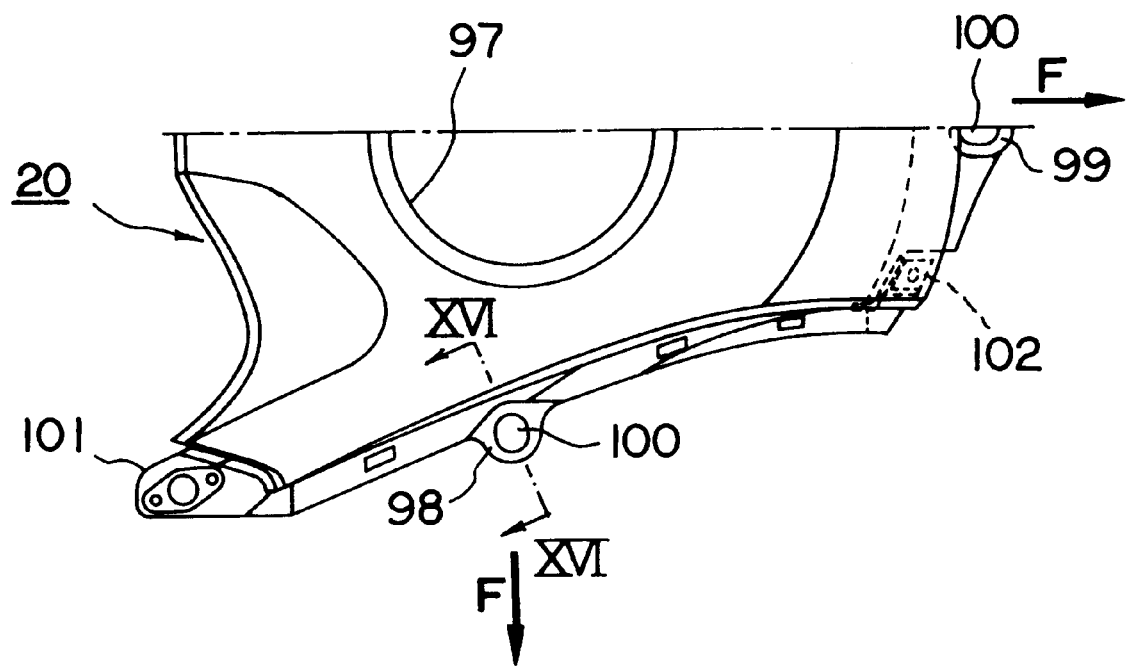
FIG. 14 is a plan view of the tank upper cover.
Figure 15:
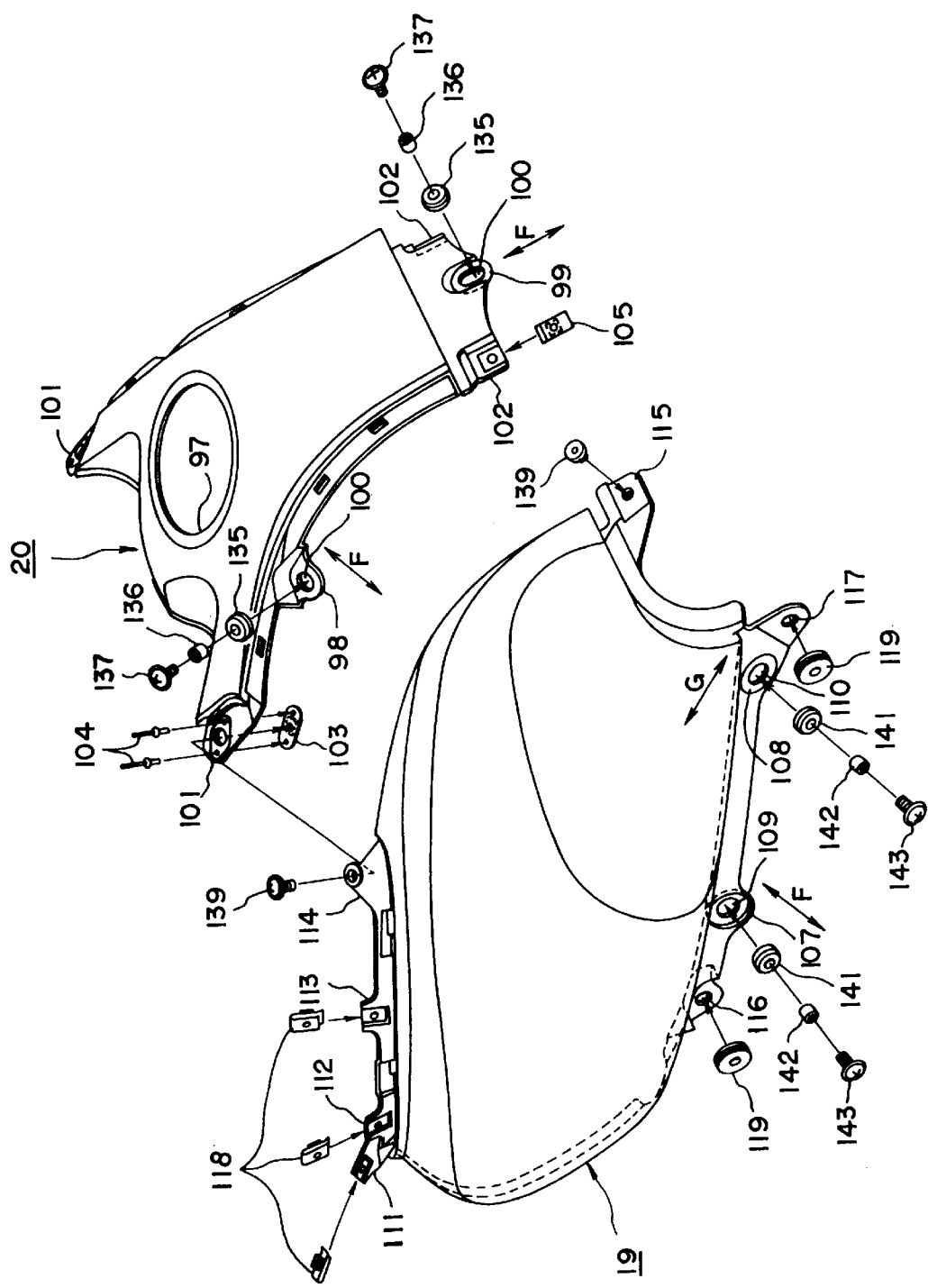
FIG. 15 is an exploded perspective view showing the tank side cover and the tank upper cover.
Figure 16:
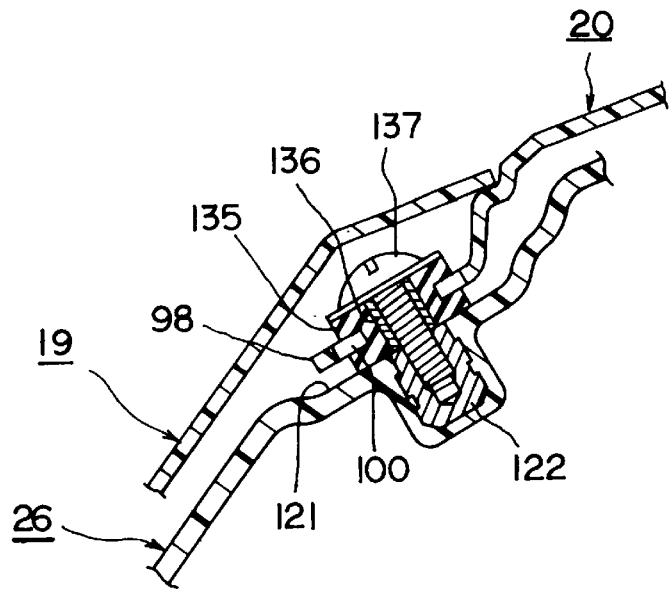
FIG. 16 is a longitudinally cross-sectional view cut along the line XVI—XVI shown in FIG. 4 and FIGS. 13 and 14.

By the way, FIG. 13 is a left side view showing a state in which a tank side cover 19 and a tank upper cover 20 constituting the frame cover 16 are combined. Moreover FIG. 14 is a plan view showing the tank upper cover 20. Also, FIG. 15 is an exploded perspective view showing the tank side cover 19 and the tank upper cover 20. Further, FIG. 16 is a longitudinally cross-sectional view cut along the line XVI—XVI shown in FIG. 4 and FIGS. 13 and 14, and 17 is a longitudinally cross-sectional view cut along the line XVII—XVII of FIG. 3.

As described before, right and left side portions of the tank main body 26 are covered by the tank side cover 19. On the other hand, the upper portion thereof is covered by the tank upper cover 20. The tank upper cover 20 is formed with a circular opening 97 as a fixing reference portion on the center thereof. An inner diameter of the opening 97 is set so as to be closely fitted into an outer diameter of the fuel supply portion of the tank main body 26, for example, the receiving pan portion 56 (e.g., pan member 59) provided on the fuel supply port 50. Further, the tank upper cover 20 is provided with a total of three tank fastening members 98, 98 and 99 at the right and left portions thereof and at the rear portion thereof. Each of these fastening parts 98, 98 and 99 is formed with a fastening member insertion hole 100. Each fastening member insertion hole 100 is formed into a short slot extending along a radial direction F (see FIG. 14 and FIG. 15) from the opening 97.

Further, the tank upper cover 20 is provided with cover fastening parts 101, 101, 102 and 102 at each of four corners thereof. A nut plate 103 is fixed to the cover fastening parts 101 and 101 on the front side from below by means of two rivets 104 or the like. On the other hand, a clip nut is inserted into the cover fastening parts 102 and 102 on the rear side.

Moreover, each of right and left tank side covers 19 is provided with two front and rear tank fastening parts 107 and 108 at the lower side portion thereof. These tank fastening parts 107 and 108 are formed with a fastening member insertion hole 109 and 110, respectively. The fastening member insertion hole 109 of the front tank fastening part 107 is formed into a short slot extending from the opening 97 of the tank upper cover 20 to a radial direction F (see FIG. 13 and FIG. 15) when the tank side cover 19 is connected and fixed to the tank upper cover 20. Also, the fastening member insertion hole 110 of the rear tank fastening part 108 is formed into a slot extending substantially along a longitudinal direction G (see FIG. 15) from the opening 97 of the tank upper cover 20.

Further, the tank side cover 19 is provided with a total of five cover fastening parts 111 to 115 at the upper side portion thereof. Cover attaching holes 116 and 117 are provided on front and rear sides of respective tank fastening parts 107 and 108. A clip nut 118 is inserted into each of the three cover fastening parts 111 to 113 on the front side. A rubber push 119 having a small hole is fitted into each of the cover attaching holes 116 and 117.

Meanwhile, as shown in FIGS. 4 and 16, both shoulder portions of the tank main body 26 is formed with an inclined flat cover fastening surface 121 in which an insert nut 122 is embedded. Also, the rear portion of the fuel supply port 50 of the tank main body 26 is formed with a cover fastening surface 123 in which an insert nut 124 is embedded (see FIG. 4).

Figure 17:
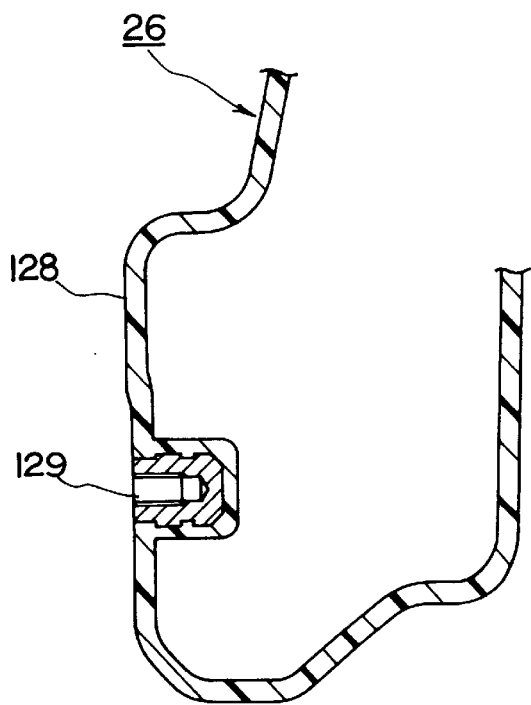
FIG. 17 is a longitudinally cross-sectional view cut along the line XVII—XVII of FIG. 3.

As shown in FIGS. 2, 3, 5 and 6, a recess portion 126 is formed at each of right and left sides on the front lower portion of the tank main body 26, and an insert nut 127 is embedded therein. As shown in FIGS. 2, 3 and 17, on right and left sides of the rear lower portion of the tank main body 26, there is formed a convex portion 128 which is situated on a rear or backward side of recess portion 126, and an insert nut 129 is embedded therein.

Figure 20:
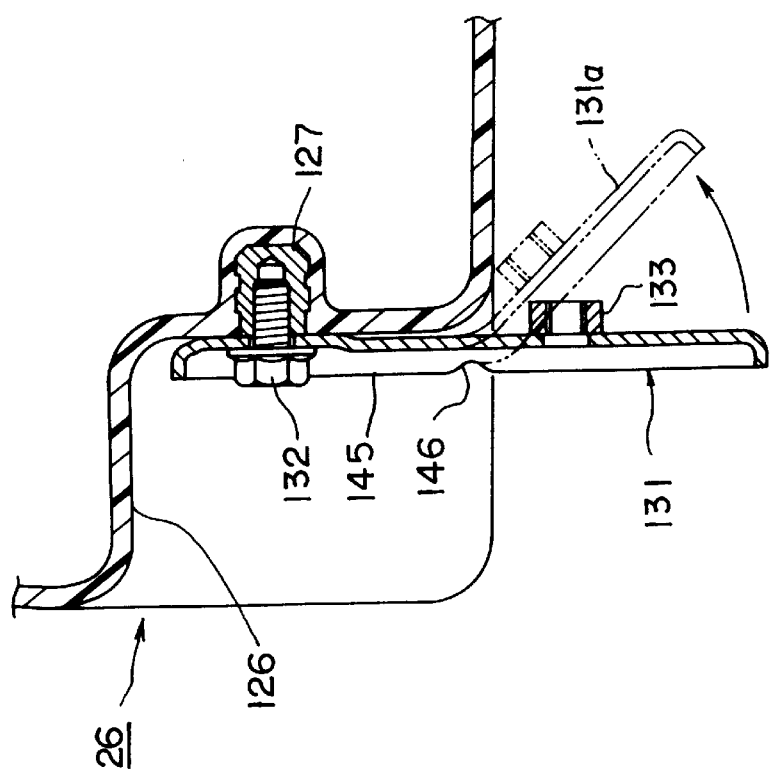
FIG. 20 is a longitudinally cross-sectional view showing a state in which the cover bracket is fastened onto a recess portion of the tank main body.
Figure 19:
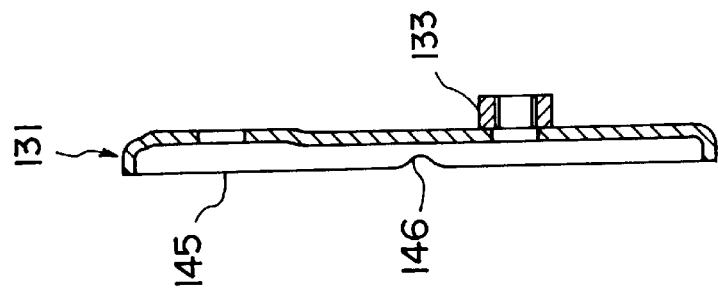
FIG. 19 is a longitudinally cross-sectional view cut along the line XIX—XIX of FIG. 18.
Figure 18:
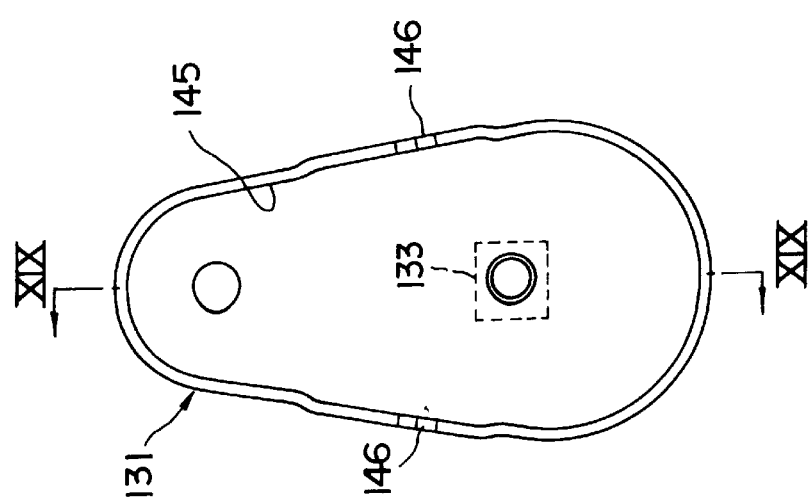
FIG. 18 is a side view of a cover bracket for fixing the tank side cover to the tank main body.

As shown in FIGS. 18 to 20, an upper end of a cover bracket 131, which is formed by subjecting plate and sheet to press molding, is fastened to the insert nut 127 of the recess portion 126. The cover bracket 131 is formed into a substantially elliptic shape, and a nut 133 is fixed and attached from inside to the lower end of cover bracket 131.

The opening 97 of the tank upper cover 20 is engaged with (e.g., fitted into) the receiving pan portion 56 of the tank main body 26 while three tank fastening parts 98, 98 and 99 thereof being floatingly fixed to the tank main body 26. As shown in FIG. 15 and 16, a cushion member 135 such as rubber bush or the like and a metallic pipe spacer 136 are fitted into each of these three tank fastening parts 98, 98 and 99, and a vise 137 is inserted into each spacer 136 from outside. These vises 137 are individually fastened to the insert nuts 122 and 124 of the cover fastening surfaces 121 and 123 of the tank main body 26.

Since a clamping force of respective fastening members (e.g., vises) 137 is released to the tank main body 26 via the spacer 136, the cushion member 135 is not crushed. Thus, respective tank fastening parts 98, 98 and 99 are floating fixed to the tank main body 26 by the elasticity of cushion member 135.

The tank side cover 19 is connected and fixed to the tank upper cover 20 by its cover fastening parts 114 and 115 being respectively fastened and fixed onto the cover fastening part 101 (e.g., nut plate 103) and the cover fastening part 102 (e.g., clip nut 105) of the tank upper cover 20 by means of the vises 139. Also, the cover fastening parts 114 and 115 and the vises 139 are not exposed on the exterior surface because they are covered from top by the front cowl 18 and the seat 6.

Further, the cushion member 141 such as rubber push or the like and the metallic pipe spacer 142 are fitted into each of two fastening parts 107 and 108 of respective tank side covers 19, and then, the vise 143 is inserted from outside into each spacer 142. Subsequently, these vises 143 are fastened to the nut 133 of the cover bracket 131 fixed on the tank main body 26 and the insert nut 129 of the convex portion 128 of the tank main body 26. Here, a clamping force of respective fastening members (e.g, vises) 143 is also released to the cover bracket 131 and the tank main body 26 via the spacer 142. Thus, respective tank fastening parts 107 and 108 are floatingly fixed to the cover bracket 131 and the tank main body 26 by the elasticity of cushion member 135.

As seen from the above description, the tank upper cover 20 and the tank side covers 19 are connected and fixed to each other while being floatingly fixed to the tank main body 26. Also, the front cowl 18 is fastened and fixed to the clip nut 118 inserted into the cover fastening parts 111, 112 and 113 of the tank side cover 19 by means of a vise (not shown). Further, a protrusion (not shown) formed on the inner surface of the engine side cover 21 is fitted into the rubber bush 119 of the cover fastening hole 116 and 117 of the tank side cover 19.

The opening 97 of the tank upper cover 20 is fitted into the receiving pan portion 56 of the tank main body 26, and thereby, the tank upper cover 20 is accurately positioned with respect to the tank main body 26 (e.g., vehicle body). Also, the tank side covers 19 connected to the tank upper cover 20 (e.g., in addition, the whole of frame cover 16) are accurately positioned with respect to the tank main body 26 (e.g., the vehicle body).

Further, respective tank fastening parts 98, 99,107 and 108 of the tank upper cover 20 and the tank side cover 19 are floatingly fixed to the tank main body 26, and thereby, a rotation and a vertical (e.g., up and down) motion of the tank upper cover 20 and the tank side covers 19 with respect to the tank main body 26 can be restricted.

Now, in the case where the tank main body swells due to contact with a fuel and the whole of tank main body becomes large in its shape. For this reason, a dimensional deformation is generated between the tank main body 26, the tank side covers 19 and the tank upper cover 20. However, the opening 97, which is a fixing reference portion of the tank upper cover 20, is fixed to (e.g., fitted into) the receiving pan portion 56 of the tank main body 26, so that the tank fastening parts 98, 99, and 107 relatively separated from the opening 97 can be moved on the upper surface of the tank main body 26 along the direction F radially extending from the receiving pan portion 56.

At that time, fastening members 137 and 143 fixing these tank fastening parts 98, 99, and 107 are relatively moved along the longitudinal direction (F) of the fastening member insertion hole of respective tank fastening parts 98, 99, and 107 together with cushion members 135 and 141 and spacers 136 and 142, so that no unreasonable force is applied to the tank upper cover 20 and the tank side covers 19 due to a dimensional deformation by swelling of the tank main body 26.

Moreover, since the tank upper cover 20 and the tank side covers 19 are directly fixed to the tank main body 26, a shift, unevenness or the like is hard to be caused between two cover members 19 and 20 and between these cover members 19 and 20 and the tank main body 26. Therefore, a visible appearance around the fuel tank system 5 can be preferably maintained.

In the present embodiment, only fastening member insertion hole 110 of the rear tank fastening parts 108 of the tank side cover 19 is exceptionally formed into a slot extending along the longitudinal direction G of the tank side cover 19. This is for absorbing a dimensional deformation in the front and rear directions when the tank side cover 19, which has a shape extending from the front to the rear, swells or shrinks.

By the way, as described above, the cover bracket 131 for fixing the tank side cover 19 is fixed to the tank main body 26. The cover bracket 131 is fastened and fixed to the insert nut 127 embedded in the recess portion 126 formed on right and left sides of the front lower portion of the tank main body 26 by means of the bolt 132. The recess portion 126 is formed into a similar figure, which is slightly larger than the cover bracket 131.

Therefore, the cover bracket 131, which is fixed in the recess portion 126, is restricted from being rotated, and also fixed to the tank main body 26 by means of only one bolt 132 without being rotated. This contributes to simplification of a fixing portion structure on the tank main body 26 side of the cover bracket 131.

Further, the cover bracket 131 is molded by subjecting a plate and a sheet to press molding. As shown in FIGS. 18 to 20, the cover bracket 131 is formed with a short longitudinal wall-like flange 145 over the entire circumference thereof. A linear portion of the flange 145 is formed with a pair of notches 146. The notches 146 function as rigid lowering structure for allowing a side of the cover bracket 131 to be lowered in a bending fashion as shown in FIG. 20. Further, the position of notches 146 are set at a position such that the cover bracket 131 overlaps with a side profile of the tank main body 26 in its side view.

For this reason, in the case where a great force is applied to the side of the cover bracket 131, such as when the motor bicycle 1 slips and falls down, the cover bracket 131 is bent from the notch portion 146 into the tank main body 26 side, as a cover bracket 131a shown in FIG. 20. Since the notch 146 is provided at the position such that the cover bracket 131 overlaps with a side profile, alternatively referred to as a side portion of the tank main body 26, a stress to the tank main body 26 due to bending of the cover bracket 131 is prevented from being concentrated, so that the tank main body 26 can be effectively protected.

Figure 11:
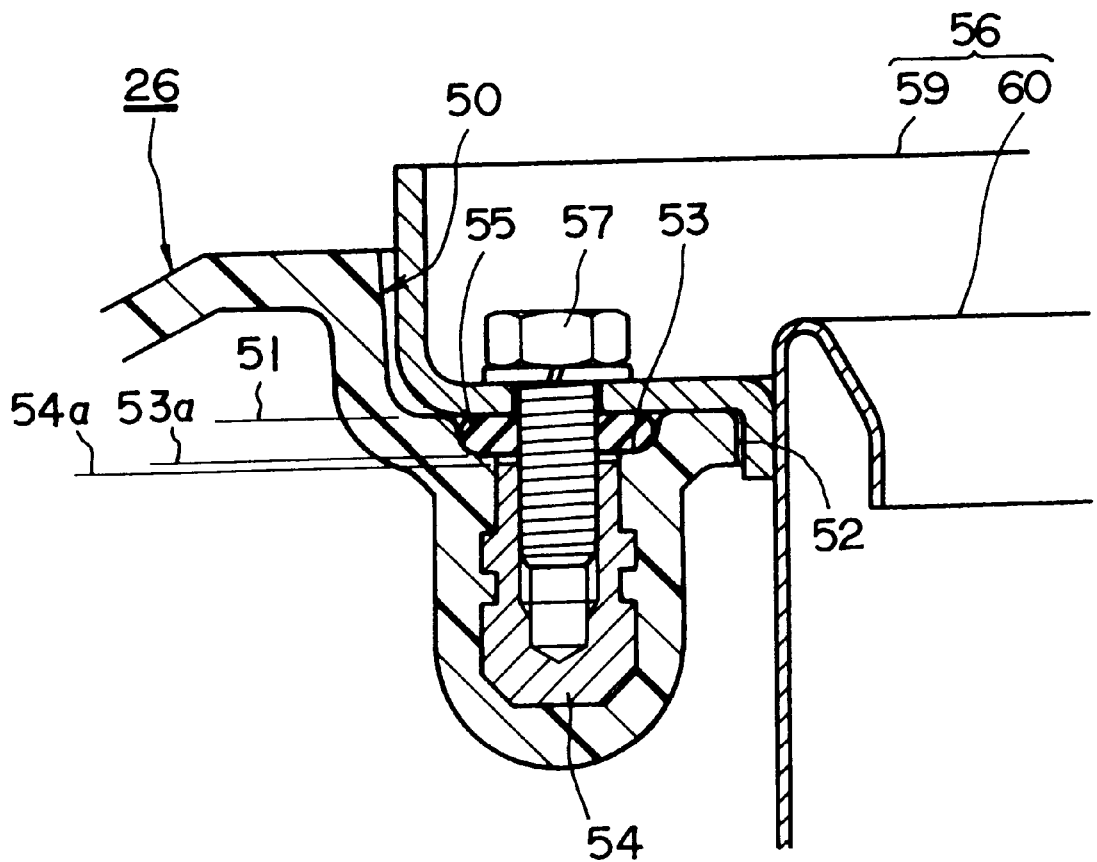
FIG. 11 is an enlarged view of a portion XI of FIG. 2.

Meanwhile, when the tank main body 2 is enlarged as shown in FIG. 11, the insert nut 54 embedded in the fuel supply port 50 (e.g, gasket groove 53) is embedded so that an external exposure surface 54a thereof becomes about 0.5 to 1.0 mm lower than the insert embedded surface of the tank main body 26, that is, a bottom surface 53a of the gasket groove 53.

By doing so, the insert nut 54 is prevented from biting into the gasket 55 of the receiving pan portion 56 fastened to the inserted nut 54, and the gasket 55 is also prevented from being damaged by the insert nut 54. Moreover, the gasket 55 is fully and closely fitted into the gasket groove 53 over the entire circumference of the bottom surface 53a of the gasket groove 53, so that seal performance of the gasket 55 can be greatly improved.

Even in the case where the receiving pan portion 56 is fastened directly onto the receiving pan fixing surface 51 without interposing the gasket 55 between the receiving pan portion 56 and the tank main body 26, if the external exposure surface 54a of the insert nut 54 is set so as to become lower than the receiving pan fixing surface 51, the receiving pan portion 56 is fully and closely abutted against the receiving pan fixing surface 51, so that the receiving pan portion 56 can be stably fastened thereto.

Further, without being limited to the insert nut 54 for fastening the receiving pan portion 56, the embedded structure as described above may be applied to other insert nuts embedded in the tank main body 26, for example, insert nuts 32, 39 and 45 for fastening respective fixing members 27, 28L, 28R and 29, the insert nut 74 for fastening the remained fuel gauge 72, insert nuts 122, 124, 127 and 129 for fastening the tank side covers 19 and the tank upper cover 20, etc. Also, the insert nut embedded structure is applicable to various insert nut embedded portions in other vehicles, ships, buildings and the like, without being limited to the fuel tank system for a motor bicycle.

What is claimed is:

1. A motor bicycle fuel tank system comprising:
    a tank main body made of a synthetic resin material and configured into a reverse U-shaped sectional portion with respect to a longitudinal axis of the tank main body so as to straddle a front head portion of a motor bicycle body frame when the motor bicycle fuel tank system is arranged on the motor bicycle while in an assembled state;
    a fuel supply port provided on an upper portion of the tank main body;
    a receiving pan portion provided in the fuel supply port and configured to extend along an attachment direction when attached to the fuel supply port;
    a relay joint arranged in a vicinity of a bottom portion of the tank main body and configured to be attached to the bottom portion of the tank main body along a direction that is substantially the same as the attachment direction of the receiving pan portion; and
    a drain pipe comprising a soft hose passing through an interior of the tank main body and connected to the receiving pan portion and the relay joint when the receiving pan portion is attached to the fuel supply portion and when relay joint is attached to the bottom portion of the tank main body.

2. The motor bicycle fuel tank system according to claim 1, further comprising
    a fixing member formed out of a rigid material independent from the tank main body and configured to fix the tank main body to the motor bicycle frame when the motor bicycle fuel tank system is in the assembled state, said fixing member having a fixing portion on the tank main body side and configured to surround a fixture plate of the relay joint, and wherein the fixing member has a shape in its side view such that at least part of the fixing member is situated on a position lower than the relay joint when the fixing member is fixed to the tank main body.

3. The motor bicycle fuel tank system according to claim 1, further comprising
    a front portion fixing member provided at a top front location of the reverse U-shaped sectional portion of the tank main body and having a load acting surface extending from the top front location along a direction substantially parallel to the longitudinal axis of the tank main body so as to define a side view angle between a horizontal direction and an angle substantially orthogonal to a longitudinal direction of a front fork of the motor bicycle so that the load acting surface of the front portion fixing member is floatingly fixed to the motor bicycle body frame when the fuel tank system is arranged on the motor bicycle while in the assembled state.

4. The motor bicycle fuel tank system according to claims 1 or 3, further comprising a plurality of side portion fixing members each provided at a forward location of the tank main body and on both sides of a lower portion of the reverse U-shaped sectional portion and each having a load acting surface extending from the forward location along a direction substantially perpendicular to a dimensional enlargement direction of the tank main body and defining an angle substantially parallel to a central surface of the motor bicycle body frame so that the respective load acting surfaces are floatingly fixed and relatively movable with respect to the motor bicycle body frame when the motor bicycle fuel tank system is arranged on the motor bicycle while in the assembled state, and such that a relative movement direction of each of the respective load acting surfaces of the side portion fixing members is parallel to the dimensional enlargement direction when the tank main body swells.

5. The motor bicycle fuel tank system according to any of claims 1, 2, or 3, further comprising a rear portion fixing member provided on a rearmost portion of the tank main body and having a load acting surface extending from the rearmost portion along a direction substantially perpendicular to a dimensional enlargement direction of the tank main body so as to be floatingly fixed and relatively movable with respect to the motor bicycle body frame when the motor bicycle fuel tank system is arranged on the motor bicycle while in the assembled state, and such that a relative movement direction of the load acting surface is parallel to the dimensional enlargement direction when the tank main body swells.

6. The motor bicycle fuel tank system according to claim 1, further comprising:

at least one recessed knee grip surface formed on a side surface of the tank main body; and a plurality of grip grooves formed on opposite sides of the at least one recessed knee grip surface so that the side surface of the tank main body defines a wave shape, and configured such that a longitudinal direction of each respective grip groove is parallel to a divisional direction of a mold for molding the tank main body, said plurality of grip grooves each having a draft configured such that a width dimension of an upper end of the grip groove is greater than a width dimension of a lower end thereof, and the upper end of the grip groove defines an open shape and the lower end of the grip groove defines a closed shape.

7. The motor bicycle fuel tank system according to claim 1, further comprising a frame cover configured to cover the tank main body, said frame cover having a fixing reference portion fitted into a fuel supply portion positioned at a top location of the tank main body, and a plurality of tank fastening parts each configured to cooperate with a respective fastening member and a respective cushion member so as to floatingly fix the frame cover to the tank main body when the motor bicycle fuel tank system is in the assembled state, said tank fastening parts each having fastening member insertion holes formed into a slot extending along a radial direction from the fixing reference portion.

8. The motor bicycle fuel tank system according to claim 1, further comprising:

a recess portion provided on a side of the tank main body; and an independent cover bracket having a first end fixed into the recess portion provided on the side of the tank main body, a second end fixed to the frame cover when the motor bicycle fuel tank system is in the assembled state, and a rigid lowering structure configured for allowing a side of the cover bracket to be lowered in an bending fashion about a position adjacent to a side profile of the tank main body in response to a force applied to a side of the cover bracket.

9. The motor bicycle fuel tank system according to claim 1, further comprising:

recess portions provided on inner longitudinal wall surfaces of the reverse U-shaped sectional portion of the tank main body, each of the recess portions configured relative to a side view so as to be open in a direction separating from each other substantially at the right angle with respect to the upper portion of the reverse U-shaped sectional portion, and elastic cushion members each individually interposed between one of the recess portions and a respective side surface of the motor bicycle body frame, said elastic cushion members configured to be fixed to the motor bicycle body frame side surface so that a clearance is defined between each of the elastic cushion members and each of the recess portions when the fuel tank system is placed on the motor bicycle such that the tank main body straddles the front head portion of the motor bicycle body frame.

10. The motor bicycle fuel tank system according to any of claims 1, 2, 3, 7, 8 or 9, further comprising an insert nut embedded in the tank main body, so as to define and external exposure and an insert nut embedded surface of the tank main body, said insert nut being configured so that other components are fastened thereto, and such that the external exposure surface thereof becomes lower than the insert nut embedded surface of the tank main body when embedded in the tank main body.

11. A motor bicycle fuel tank system comprising:

a tank main body made of a synthetic resin material and configured into a reverse U-shaped sectional portion with respect to a longitudinal axis of the tank main body so as to straddle a front head portion of a motor bicycle body frame when the motor bicycle fuel tank system is arranged on the motor bicycle while in an assembled state;

a fuel supply port provided on an upper portion of the tank main body;

a front portion fixing member provided at a top front location of the reverse U-shaped sectional portion of the tank main body and having a load acting surface extending from the top front location so as to define a side view angle between a horizontal direction and a direction substantially orthogonal to a longitudinal direction of a front fork of the motor bicycle, the load acting surface including an aperture supporting a fastening member having a longitudinal axis substantially parallel to the longitudinal direction of the front fork such that the load acting surface of the front portion fixing member is floating fixed to the motor bicycle body frame when the motor bicycle fuel tank system is in the assembled state.

12. The motor bicycle fuel tank system according to claim 11, wherein the load acting surface of the front portion fixing member extends from the top front location of the reverse U-shaped sectional portion along a direction substantially parallel to the longitudinal axis of the tank main body.

13. A motor bicycle fuel tank system comprising:
a tank main body made of a synthetic resin material and configured into a reverse U-shaped sectional portion with respect to a longitudinal axis of the tank main body so as to straddle a front head portion of a motor bicycle body frame when the motor bicycle fuel tank system is arranged on the motor bicycle while in an assembled state;
a fuel supply port provided on an upper portion of the tank main body;
at least one fixing member provided on a portion of the tank main body and having a load acting surface extending from the portion along a direction substantially perpendicular to a dimensional enlargement direction of the tank main body so as to be moveably connected with respect to the motor bicycle body frame when the fuel tank system is in the assembled state, and such that a movement direction of the load acting surface relative to the motor bicycle body frame is parallel to the dimensional enlargement direction when the tank main body swells.

14. The motor bicycle fuel tank system according to claim 13, wherein the at least one fixing member comprises a rear portion fixing member provided on a rearmost portion of the tank main body, said load acting surface extending from the rearmost portion along a direction substantially perpendicular to the dimensional enlargement direction of the tank main body.

15. The motor bicycle fuel tank system according to claim 13, wherein the at least one fixing member comprises a side portion fixing member provided at a forward location of the tank main body and on a side of a lower portion of the reverse U-shaped sectional portion, said load acting surface extending from the forward location along a direction substantially perpendicular to the dimensional enlargement direction of the tank main body.

16. A motor bicycle fuel tank system comprising:
a tank main body made of a synthetic resin material and configured into a reverse U-shaped sectional portion with respect to a longitudinal axis of the tank main body so as to straddle a front head portion of a motor bicycle body frame when the fuel tank system is arranged on the motor bicycle while in an assembled state;
a fuel supply port provided on an upper portion of the tank main body;
at least one recessed knee grip surface formed on a side surface of the tank main body; and
a plurality of grip grooves formed on opposite sides of the at least one recessed knee grip surface so that the side surface of the tank main body defines a wave shape, and configured such that a longitudinal direction of each respective grip groove is parallel to a divisional direction of a mold for molding the tank main body, said plurality of grip grooves each having a draft configured such that a width dimension of an upper end of the grip groove is greater than a width dimension of a lower end thereof.

17. The motor bicycle fuel tank system according to claim 16, wherein the upper end of the grip groove defines an open shape and the lower end of the grip groove defines a closed shape.

18. A motor bicycle fuel tank system comprising:
a tank main body made of a synthetic resin material and configured into a reverse U-shaped sectional portion with respect to a longitudinal axis of the tank main body so as to straddle a front head portion of a motor bicycle body frame when the fuel tank system is arranged on the motor bicycle while in an assembled state;
a fuel supply port provided on an upper portion of the tank main body;
a recess portion provided on a side of the tank main body; and
an independent cover bracket having a first end fixed into the recess portion provided on the side of the tank main body, a second end fixed to the frame cover when the fuel tank system is in the assembled state, and a rigid lowering structure configured for allowing a side of the cover bracket to be lowered in a bending fashion about a position adjacent to a side portion of the tank main body in response to a force applied to a side of the cover bracket.

19. A motor bicycle fuel tank system comprising:
a tank main body made of a synthetic resin material and configured into a reverse U-shaped sectional portion with respect to a longitudinal axis of the tank main body so as to straddle a front head portion of a motor bicycle body frame when the fuel tank system is placed on the motor bicycle while in an assembled state;
a fuel supply port provided on an upper portion of the tank main body;
recess portions provided on inner longitudinal wall surfaces of the reverse U-shaped sectional portion of the tank main body, each of the recess portions having a perpendicular indent and configured relative to a cross sectional view so as to extend away from each other and define inner side clearance spaces;
a support member slidably supported by the motor bicycle body frame so as to extend between each of the recess portions; and
elastic cushion members each individually interposed between one of the recess portions and a respective side surface of the motor bicycle body frame, said elastic cushion members configured to be fixed to the support member supported by the motor bicycle body frame so that a clearance is defined between each of the elastic cushion members and each of the recess portions when the fuel tank system is placed on the motor bicycle such that the tank main body straddles the front head portion of the motor bicycle body frame.

20. The motor bicycle fuel tank system according to claims 11, 13, 16, 18 or 19, further comprising
a fixing member formed out of a rigid material independent from the tank main body and configured to fix the tank main body to the motor bicycle body frame when the fuel tank system is in the assembled state, said fixing member having a fixing portion on the tank main body side and configured to surround a fixture plate of the relay joint, and wherein the fixing member has a shape in its side view such that at least part of the fixing member is situated on a position lower than the relay joint when the fixing member is fixed to the tank main body.

21. The motor bicycle fuel tank system according to any of claims 11, 13, 16, 18, or 19, further comprising
an insert nut embedded in the tank main body, so as to define and external exposure and an insert nut embedded surface of the tank main body, said insert nut being configured for being fastened to a plurality of fastening components, and such that the external exposure surface thereof becomes lower than the insert nut embedded surface of the tank main body when embedded in the tank main body.

22. The motor bicycle fuel tank system according to claim 11, further comprising at least one rubber cushion having an aperture for supporting the fastening member while the load acting surface of the front portion fixing member is floatingly fixed to the motor bicycle body frame.

23. The motor bicycle fuel tank system according to claim 11, wherein the fastening member is fastened to a fixing bracket located on a head pipe of the motor bicycle body frame.

24. The motor bicycle fuel tank system according to claim 19, wherein the support member is slideably connected to reinforcement plates of the motor bicycle body frame.

25. The motor bicycle fuel tank system according to claim 19, wherein each of the elastic cushion members include a plate configured for abutting respective ends of the support member when the elastic cushion members are fixed to the support member.

* * * * *